US007949636B2

(12) United States Patent
Akidau et al.

(10) Patent No.: US 7,949,636 B2
(45) Date of Patent: May 24, 2011

(54) SYSTEMS AND METHODS FOR A READ ONLY MODE FOR A PORTION OF A STORAGE SYSTEM

(75) Inventors: Tyler A. Akidau, Seattle, WA (US); Neal T. Fachan, Seattle, WA (US); Aaron J. Passey, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 520 days.

(21) Appl. No.: 12/057,303

(22) Filed: Mar. 27, 2008

(65) Prior Publication Data

US 2009/0248756 A1 Oct. 1, 2009

(51) Int. Cl.
 *G06F 17/30* (2006.01)
(52) U.S. Cl. ........................................ 707/640; 707/648
(58) Field of Classification Search ........... 707/640–668
 See application file for complete search history.

(56) References Cited

U.S. PATENT DOCUMENTS

| 5,163,131 A | 11/1992 | Row et al. |
| 5,181,162 A | 1/1993 | Smith et al. |
| 5,212,784 A | 5/1993 | Sparks |
| 5,230,047 A | 7/1993 | Frey et al. |
| 5,251,206 A | 10/1993 | Calvignac et al. |
| 5,258,984 A | 11/1993 | Menon et al. |
| 5,329,626 A | 7/1994 | Klein et al. |
| 5,359,594 A | 10/1994 | Gould et al. |
| 5,403,639 A | 4/1995 | Belsan et al. |
| 5,459,871 A | 10/1995 | Van Den Berg |
| 5,481,699 A | 1/1996 | Saether |
| 5,548,724 A | 8/1996 | Akizawa et al. |
| 5,548,795 A | 8/1996 | Au |
| 5,568,629 A | 10/1996 | Gentry et al. |
| 5,596,709 A | 1/1997 | Bond et al. |
| 5,606,669 A | 2/1997 | Bertin et al. |
| 5,612,865 A | 3/1997 | Dasgupta |
| 5,649,200 A | 7/1997 | Leblang et al. |
| 5,657,439 A | 8/1997 | Jones et al. |
| 5,668,943 A | 9/1997 | Attanasio et al. |

(Continued)

FOREIGN PATENT DOCUMENTS

EP 0774723 5/1997

(Continued)

OTHER PUBLICATIONS

Oct. 8, 2008 European Supplemental Search Report EP 02 75 6944, 6 pages.

(Continued)

*Primary Examiner* — Wilson Lee
(74) *Attorney, Agent, or Firm* — Knobbe Martens Olson & Bear LLP

(57) ABSTRACT

In general, embodiments of the invention relate to reading data from and writing data to a storage system. Specifically, embodiments of the invention relate to a read only mode for a portion of a storage system. In one embodiment, a selective read-only mode for a portion of a storage system is implemented by monitoring a condition that may affect a subset of persistent storage in a storage system, by detecting the condition, by entering a read-only mode for the subset, and by enforcing a policy of processing write requests and read requests to the storage system, which includes processing the write requests without modifying user data stored on the subset and processing the read requests, including requests for user data stored on the subset.

20 Claims, 16 Drawing Sheets

U.S. PATENT DOCUMENTS

| | | |
|---|---|---|
| 5,680,621 A | 10/1997 | Korenshtein |
| 5,694,593 A | 12/1997 | Baclawski |
| 5,696,895 A | 12/1997 | Hemphill et al. |
| 5,734,826 A | 3/1998 | Olnowich et al. |
| 5,754,756 A | 5/1998 | Watanabe et al. |
| 5,761,659 A | 6/1998 | Bertoni |
| 5,774,643 A | 6/1998 | Lubbers et al. |
| 5,799,305 A | 8/1998 | Bortvedt et al. |
| 5,805,578 A | 9/1998 | Stirpe et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann et al. |
| 5,870,563 A | 2/1999 | Roper et al. |
| 5,878,410 A | 3/1999 | Zbikowski et al. |
| 5,878,414 A | 3/1999 | Hsiao et al. |
| 5,884,046 A | 3/1999 | Antonov |
| 5,884,098 A | 3/1999 | Mason, Jr. |
| 5,884,303 A | 3/1999 | Brown |
| 5,890,147 A | 3/1999 | Peltonen et al. |
| 5,917,998 A | 6/1999 | Cabrera et al. |
| 5,933,834 A | 8/1999 | Aichelen |
| 5,943,690 A | 8/1999 | Dorricott et al. |
| 5,966,707 A | 10/1999 | Van Huben et al. |
| 5,996,089 A | 11/1999 | Mann |
| 6,000,007 A | 12/1999 | Leung et al. |
| 6,014,669 A | 1/2000 | Slaughter et al. |
| 6,021,414 A | 2/2000 | Fuller |
| 6,029,168 A | 2/2000 | Frey |
| 6,038,570 A | 3/2000 | Hitz et al. |
| 6,044,367 A | 3/2000 | Wolff |
| 6,052,759 A | 4/2000 | Stallmo et al. |
| 6,055,543 A | 4/2000 | Christensen et al. |
| 6,055,564 A | 4/2000 | Phaal |
| 6,070,172 A | 5/2000 | Lowe |
| 6,081,833 A | 6/2000 | Okamoto et al. |
| 6,081,883 A | 6/2000 | Popelka et al. |
| 6,108,759 A | 8/2000 | Orcutt et al. |
| 6,117,181 A | 9/2000 | Dearth et al. |
| 6,122,754 A | 9/2000 | Litwin et al. |
| 6,138,126 A | 10/2000 | Hitz et al. |
| 6,154,854 A | 11/2000 | Stallmo |
| 6,173,374 B1 | 1/2001 | Heil et al. |
| 6,209,059 B1 | 3/2001 | Ofer et al. |
| 6,219,693 B1 | 4/2001 | Napolitano et al. |
| 6,321,345 B1 | 11/2001 | Mann |
| 6,334,168 B1 | 12/2001 | Islam et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,393,483 B1 | 5/2002 | Latif et al. |
| 6,397,311 B1 | 5/2002 | Capps |
| 6,405,219 B2 | 6/2002 | Saether et al. |
| 6,408,313 B1 | 6/2002 | Campbell et al. |
| 6,415,259 B1 | 7/2002 | Wolfinger et al. |
| 6,421,781 B1 | 7/2002 | Fox et al. |
| 6,434,574 B1 | 8/2002 | Day et al. |
| 6,449,730 B2 | 9/2002 | Mann |
| 6,453,389 B1 | 9/2002 | Weinberger et al. |
| 6,457,139 B1 | 9/2002 | D'Errico et al. |
| 6,463,442 B1 | 10/2002 | Bent et al. |
| 6,499,091 B1 | 12/2002 | Bergsten |
| 6,502,172 B2 | 12/2002 | Chang |
| 6,502,174 B1 | 12/2002 | Beardsley |
| 6,523,130 B1 | 2/2003 | Hickman et al. |
| 6,526,478 B1 | 2/2003 | Kirby |
| 6,546,443 B1 | 4/2003 | Kakivaya et al. |
| 6,549,513 B1 | 4/2003 | Chao et al. |
| 6,557,114 B2 | 4/2003 | Mann |
| 6,567,894 B1 | 5/2003 | Hsu et al. |
| 6,567,926 B2 | 5/2003 | Mann |
| 6,571,244 B1 | 5/2003 | Larson |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,594,744 B1 | 7/2003 | Humlicek et al. |
| 6,598,174 B1 | 7/2003 | Parks et al. |
| 6,618,798 B1 | 9/2003 | Burton et al. |
| 6,631,411 B1 | 10/2003 | Welter et al. |
| 6,658,554 B1 | 12/2003 | Moshovos et al. |
| 6,662,184 B1 | 12/2003 | Friedberg |
| 6,671,686 B2 | 12/2003 | Pardon et al. |
| 6,671,704 B1 | 12/2003 | Gondi et al. |
| 6,687,805 B1 | 2/2004 | Cochran |
| 6,725,392 B1 | 4/2004 | Frey et al. |
| 6,732,125 B1 | 5/2004 | Autrey et al. |
| 6,742,020 B1 | 5/2004 | Dimitroff et al. |
| 6,748,429 B1 | 6/2004 | Talluri et al. |
| 6,801,949 B1 | 10/2004 | Bruck et al. |
| 6,848,029 B2 | 1/2005 | Coldewey |
| 6,856,591 B1 | 2/2005 | Ma et al. |
| 6,895,482 B1 | 5/2005 | Blackmon et al. |
| 6,895,534 B2 | 5/2005 | Wong et al. |
| 6,907,011 B1 | 6/2005 | Miller et al. |
| 6,907,520 B2 | 6/2005 | Parady |
| 6,917,942 B1 | 7/2005 | Burns et al. |
| 6,920,494 B2 | 7/2005 | Heitman et al. |
| 6,922,696 B1 | 7/2005 | Lincoln et al. |
| 6,934,878 B2 | 8/2005 | Massa et al. |
| 6,940,966 B2 | 9/2005 | Lee |
| 6,954,435 B2 | 10/2005 | Billhartz et al. |
| 6,990,604 B2 | 1/2006 | Binger |
| 6,990,611 B2 | 1/2006 | Busser |
| 7,007,044 B1 | 2/2006 | Rafert et al. |
| 7,007,097 B1 | 2/2006 | Huffman et al. |
| 7,017,003 B2 | 3/2006 | Murotani et al. |
| 7,043,485 B2 | 5/2006 | Manley et al. |
| 7,043,567 B2 | 5/2006 | Trantham |
| 7,069,320 B1 | 6/2006 | Chang et al. |
| 7,103,597 B2 | 9/2006 | McGoveran |
| 7,111,305 B2 | 9/2006 | Solter et al. |
| 7,113,938 B2 | 9/2006 | Highleyman et al. |
| 7,124,264 B2 | 10/2006 | Yamashita |
| 7,146,524 B2 | 12/2006 | Patel et al. |
| 7,152,182 B2 | 12/2006 | Ji et al. |
| 7,177,295 B1 | 2/2007 | Sholander et al. |
| 7,181,746 B2 | 2/2007 | Perycz et al. |
| 7,184,421 B1 | 2/2007 | Liu et al. |
| 7,194,487 B1 | 3/2007 | Kekre et al. |
| 7,206,805 B1 | 4/2007 | McLaughlin, Jr. |
| 7,225,204 B2 | 5/2007 | Manley et al. |
| 7,228,299 B1 | 6/2007 | Harmer et al. |
| 7,240,235 B2 | 7/2007 | Lewalski-Brechter |
| 7,249,118 B2 | 7/2007 | Sandler et al. |
| 7,257,257 B2 | 8/2007 | Anderson et al. |
| 7,290,056 B1 | 10/2007 | McLaughlin, Jr. |
| 7,313,614 B2 | 12/2007 | Considine et al. |
| 7,318,134 B1 | 1/2008 | Oliveira et al. |
| 7,346,720 B2 | 3/2008 | Fachan |
| 7,370,064 B2 | 5/2008 | Yousefi'zadeh |
| 7,373,426 B2 | 5/2008 | Jinmei et al. |
| 7,386,675 B2 | 6/2008 | Fachan |
| 7,386,697 B1 | 6/2008 | Case et al. |
| 7,440,966 B2 | 10/2008 | Adkins et al. |
| 7,451,341 B2 | 11/2008 | Okaki et al. |
| 7,509,448 B2 | 3/2009 | Fachan et al. |
| 7,509,524 B2 | 3/2009 | Patel et al. |
| 7,533,298 B2 | 5/2009 | Smith et al. |
| 7,546,354 B1 | 6/2009 | Fan et al. |
| 7,546,412 B2 | 6/2009 | Ahmad et al. |
| 7,551,572 B2 | 6/2009 | Passey et al. |
| 7,558,910 B2 | 7/2009 | Alverson et al. |
| 7,571,348 B2 | 8/2009 | Deguchi et al. |
| 7,577,667 B2 | 8/2009 | Hinshaw et al. |
| 7,590,652 B2 | 9/2009 | Passey et al. |
| 7,593,938 B2 | 9/2009 | Lemar et al. |
| 7,631,066 B1 | 12/2009 | Schatz et al. |
| 7,676,691 B2 | 3/2010 | Fachan et al. |
| 7,680,836 B2 | 3/2010 | Anderson et al. |
| 7,680,842 B2 | 3/2010 | Anderson et al. |
| 7,685,126 B2 | 3/2010 | Patel et al. |
| 7,689,597 B1 * | 3/2010 | Bingham et al. ............ 707/999.2 |
| 7,739,288 B2 | 6/2010 | Lemar et al. |
| 7,743,033 B2 | 6/2010 | Patel et al. |
| 7,752,402 B2 | 7/2010 | Fachan et al. |
| 7,756,898 B2 | 7/2010 | Passey et al. |

| Patent/Publication | Kind | Date | Inventor(s) | Ref |
|---|---|---|---|---|
| 7,779,048 | B2 | 8/2010 | Fachan et al. | |
| 7,783,666 | B1 | 8/2010 | Zhuge et al. | |
| 7,788,303 | B2 | 8/2010 | Mikesell et al. | |
| 7,797,283 | B2 | 9/2010 | Fachan et al. | |
| 7,840,536 | B1 * | 11/2010 | Ahal et al. | 707/648 |
| 2001/0042224 | A1 | 11/2001 | Stanfill et al. | |
| 2001/0047451 | A1 | 11/2001 | Noble et al. | |
| 2001/0056492 | A1 | 12/2001 | Bressoud et al. | |
| 2002/0010696 | A1 | 1/2002 | Izumi | |
| 2002/0029200 | A1 | 3/2002 | Dulin et al. | |
| 2002/0035668 | A1 | 3/2002 | Nakano et al. | |
| 2002/0038436 | A1 | 3/2002 | Suzuki | |
| 2002/0055940 | A1 | 5/2002 | Elkan | |
| 2002/0072974 | A1 | 6/2002 | Pugliese et al. | |
| 2002/0075870 | A1 | 6/2002 | de Azevedo et al. | |
| 2002/0078161 | A1 | 6/2002 | Cheng | |
| 2002/0078180 | A1 | 6/2002 | Miyazawa | |
| 2002/0083078 | A1 | 6/2002 | Pardon et al. | |
| 2002/0083118 | A1 | 6/2002 | Sim | |
| 2002/0087366 | A1 | 7/2002 | Collier et al. | |
| 2002/0095438 | A1 | 7/2002 | Rising et al. | |
| 2002/0124137 | A1 | 9/2002 | Ulrich et al. | |
| 2002/0138559 | A1 | 9/2002 | Ulrich et al. | |
| 2002/0156840 | A1 | 10/2002 | Ulrich et al. | |
| 2002/0156891 | A1 | 10/2002 | Ulrich et al. | |
| 2002/0156973 | A1 | 10/2002 | Ulrich et al. | |
| 2002/0156974 | A1 | 10/2002 | Ulrich et al. | |
| 2002/0156975 | A1 | 10/2002 | Staub et al. | |
| 2002/0158900 | A1 | 10/2002 | Hsieh et al. | |
| 2002/0161846 | A1 | 10/2002 | Ulrich et al. | |
| 2002/0161850 | A1 | 10/2002 | Ulrich et al. | |
| 2002/0161973 | A1 | 10/2002 | Ulrich et al. | |
| 2002/0163889 | A1 | 11/2002 | Yemini et al. | |
| 2002/0165942 | A1 | 11/2002 | Ulrich et al. | |
| 2002/0166026 | A1 | 11/2002 | Ulrich et al. | |
| 2002/0166079 | A1 | 11/2002 | Ulrich et al. | |
| 2002/0169827 | A1 | 11/2002 | Ulrich et al. | |
| 2002/0170036 | A1 | 11/2002 | Cobb et al. | |
| 2002/0174295 | A1 | 11/2002 | Ulrich et al. | |
| 2002/0174296 | A1 | 11/2002 | Ulrich et al. | |
| 2002/0178162 | A1 | 11/2002 | Ulrich et al. | |
| 2002/0191311 | A1 | 12/2002 | Ulrich et al. | |
| 2002/0194523 | A1 | 12/2002 | Ulrich et al. | |
| 2002/0194526 | A1 | 12/2002 | Ulrich et al. | |
| 2002/0198864 | A1 | 12/2002 | Ostermann et al. | |
| 2003/0005159 | A1 | 1/2003 | Kumhyr | |
| 2003/0009511 | A1 | 1/2003 | Giotta et al. | |
| 2003/0014391 | A1 | 1/2003 | Evans et al. | |
| 2003/0033308 | A1 | 2/2003 | Patel et al. | |
| 2003/0061491 | A1 | 3/2003 | Jaskiewicz et al. | |
| 2003/0109253 | A1 | 6/2003 | Fenton et al. | |
| 2003/0120863 | A1 | 6/2003 | Lee et al. | |
| 2003/0125852 | A1 | 7/2003 | Schade et al. | |
| 2003/0135514 | A1 | 7/2003 | Patel et al. | |
| 2003/0149750 | A1 | 8/2003 | Franzenburg | |
| 2003/0158873 | A1 | 8/2003 | Sawdon et al. | |
| 2003/0161302 | A1 | 8/2003 | Zimmermann et al. | |
| 2003/0163726 | A1 | 8/2003 | Kidd | |
| 2003/0172149 | A1 | 9/2003 | Edsall et al. | |
| 2003/0177308 | A1 | 9/2003 | Lewalski-Brechter | |
| 2003/0182325 | A1 | 9/2003 | Manley et al. | |
| 2003/0233385 | A1 | 12/2003 | Srinivasa et al. | |
| 2004/0003053 | A1 | 1/2004 | Williams | |
| 2004/0024731 | A1 | 2/2004 | Cabrera et al. | |
| 2004/0024963 | A1 | 2/2004 | Talagala et al. | |
| 2004/0078812 | A1 | 4/2004 | Calvert | |
| 2004/0133670 | A1 | 7/2004 | Kaminsky et al. | |
| 2004/0143647 | A1 | 7/2004 | Cherkasova | |
| 2004/0153479 | A1 | 8/2004 | Mikesell et al. | |
| 2004/0158549 | A1 | 8/2004 | Matena et al. | |
| 2004/0189682 | A1 | 9/2004 | Troyansky et al. | |
| 2004/0199734 | A1 | 10/2004 | Rajamani et al. | |
| 2004/0199812 | A1 | 10/2004 | Earl et al. | |
| 2004/0205141 | A1 | 10/2004 | Goland | |
| 2004/0230748 | A1 | 11/2004 | Ohba | |
| 2004/0240444 | A1 | 12/2004 | Matthews et al. | |
| 2004/0260673 | A1 | 12/2004 | Hitz et al. | |
| 2004/0267747 | A1 | 12/2004 | Choi et al. | |
| 2005/0010592 | A1 | 1/2005 | Guthrie | |
| 2005/0033778 | A1 | 2/2005 | Price | |
| 2005/0044197 | A1 | 2/2005 | Lai | |
| 2005/0066095 | A1 | 3/2005 | Mullick et al. | |
| 2005/0114402 | A1 | 5/2005 | Guthrie | |
| 2005/0114609 | A1 | 5/2005 | Shorb | |
| 2005/0125456 | A1 | 6/2005 | Hara et al. | |
| 2005/0131860 | A1 | 6/2005 | Livshits | |
| 2005/0131990 | A1 | 6/2005 | Jewell | |
| 2005/0138195 | A1 | 6/2005 | Bono | |
| 2005/0138252 | A1 | 6/2005 | Gwilt | |
| 2005/0171960 | A1 | 8/2005 | Lomet | |
| 2005/0171962 | A1 | 8/2005 | Martin et al. | |
| 2005/0187889 | A1 | 8/2005 | Yasoshima | |
| 2005/0188052 | A1 | 8/2005 | Ewanchuk et al. | |
| 2005/0192993 | A1 | 9/2005 | Messinger | |
| 2005/0289169 | A1 | 12/2005 | Adya et al. | |
| 2005/0289188 | A1 | 12/2005 | Nettleton et al. | |
| 2006/0004760 | A1 | 1/2006 | Clift et al. | |
| 2006/0041894 | A1 | 2/2006 | Cheng et al. | |
| 2006/0047713 | A1 * | 3/2006 | Gornshtein et al. | 707/202 |
| 2006/0047925 | A1 | 3/2006 | Perry | |
| 2006/0059467 | A1 | 3/2006 | Wong | |
| 2006/0074922 | A1 | 4/2006 | Nishimura | |
| 2006/0083177 | A1 | 4/2006 | Iyer et al. | |
| 2006/0095438 | A1 | 5/2006 | Fachan et al. | |
| 2006/0101062 | A1 | 5/2006 | Godman et al. | |
| 2006/0129584 | A1 | 6/2006 | Hoang et al. | |
| 2006/0129631 | A1 | 6/2006 | Na et al. | |
| 2006/0129983 | A1 | 6/2006 | Feng | |
| 2006/0155831 | A1 | 7/2006 | Chandrasekaran | |
| 2006/0206536 | A1 | 9/2006 | Sawdon et al. | |
| 2006/0230411 | A1 | 10/2006 | Richter et al. | |
| 2006/0277432 | A1 | 12/2006 | Patel | |
| 2006/0288161 | A1 | 12/2006 | Cavallo | |
| 2006/0294589 | A1 * | 12/2006 | Achanta et al. | 726/24 |
| 2007/0091790 | A1 | 4/2007 | Passey et al. | |
| 2007/0094269 | A1 | 4/2007 | Mikesell et al. | |
| 2007/0094277 | A1 | 4/2007 | Fachan et al. | |
| 2007/0094310 | A1 | 4/2007 | Passey et al. | |
| 2007/0094431 | A1 | 4/2007 | Fachan | |
| 2007/0094452 | A1 | 4/2007 | Fachan | |
| 2007/0168351 | A1 | 7/2007 | Fachan | |
| 2007/0171919 | A1 | 7/2007 | Godman et al. | |
| 2007/0192254 | A1 * | 8/2007 | Hinkle | 705/51 |
| 2007/0195810 | A1 | 8/2007 | Fachan | |
| 2007/0233684 | A1 | 10/2007 | Verma et al. | |
| 2007/0233710 | A1 | 10/2007 | Passey et al. | |
| 2007/0255765 | A1 | 11/2007 | Robinson | |
| 2008/0005145 | A1 | 1/2008 | Worrall | |
| 2008/0010507 | A1 | 1/2008 | Vingralek | |
| 2008/0021907 | A1 | 1/2008 | Patel et al. | |
| 2008/0031238 | A1 | 2/2008 | Harmelin et al. | |
| 2008/0034004 | A1 | 2/2008 | Cisler et al. | |
| 2008/0044016 | A1 | 2/2008 | Henzinger | |
| 2008/0046432 | A1 | 2/2008 | Anderson et al. | |
| 2008/0046443 | A1 | 2/2008 | Fachan et al. | |
| 2008/0046444 | A1 | 2/2008 | Fachan et al. | |
| 2008/0046445 | A1 | 2/2008 | Passey et al. | |
| 2008/0046475 | A1 | 2/2008 | Anderson et al. | |
| 2008/0046476 | A1 | 2/2008 | Anderson et al. | |
| 2008/0046667 | A1 | 2/2008 | Fachan et al. | |
| 2008/0059541 | A1 | 3/2008 | Fachan et al. | |
| 2008/0126365 | A1 | 5/2008 | Fachan et al. | |
| 2008/0151724 | A1 | 6/2008 | Anderson et al. | |
| 2008/0154978 | A1 | 6/2008 | Lemar et al. | |
| 2008/0155191 | A1 | 6/2008 | Anderson et al. | |
| 2008/0168304 | A1 | 7/2008 | Flynn et al. | |
| 2008/0168458 | A1 | 7/2008 | Fachan et al. | |
| 2008/0243773 | A1 | 10/2008 | Patel et al. | |
| 2008/0256103 | A1 | 10/2008 | Fachan et al. | |
| 2008/0256537 | A1 | 10/2008 | Fachan et al. | |
| 2008/0256545 | A1 | 10/2008 | Akidau et al. | |
| 2008/0294611 | A1 | 11/2008 | Anglin et al. | |
| 2009/0055399 | A1 | 2/2009 | Lu et al. | |
| 2009/0055604 | A1 | 2/2009 | Lemar et al. | |
| 2009/0055607 | A1 | 2/2009 | Schack et al. | |
| 2009/0125563 | A1 * | 5/2009 | Wong et al. | 707/200 |
| 2009/0210880 | A1 | 8/2009 | Fachan et al. | |
| 2009/0248756 | A1 | 10/2009 | Akidau et al. | |

| | | | |
|---|---|---|---|
| 2009/0248765 | A1 | 10/2009 | Akidau et al. |
| 2009/0248975 | A1 | 10/2009 | Daud et al. |
| 2009/0249013 | A1 | 10/2009 | Daud et al. |
| 2009/0252066 | A1 | 10/2009 | Passey et al. |
| 2009/0327218 | A1 | 12/2009 | Passey et al. |
| 2010/0161556 | A1 | 6/2010 | Anderson et al. |
| 2010/0161557 | A1 | 6/2010 | Anderson et al. |
| 2010/0185592 | A1 | 7/2010 | Kryger |
| 2010/0223235 | A1 | 9/2010 | Fachan |
| 2010/0235413 | A1 | 9/2010 | Patel |

FOREIGN PATENT DOCUMENTS

| | | |
|---|---|---|
| JP | 2006/506741 | 6/2004 |
| JP | 4464279 | 5/2010 |
| JP | 4504677 | 7/2010 |
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |

OTHER PUBLICATIONS

Jan. 23, 2009 Examination Report EP 02 75 6944, 5 pages.
May 18, 2009 Int'l Search report PCT/US08/059798, 18 pages.
Oct. 22, 2009 Int'l Preliminary Report on Patentability PCT/US08/059798, 10 pages.
Keidar, et al.: Increasing the Resilience of Distributed and Replicated Database Systems (1998) pp. 1-25.
Lougher P. et al., "Scalable storage servers for digital audio and video," International Conference on Storage and Recording Systems, 1994, Keele, UK, Jan. 1, 1994, pp. 140-143.
Reddy, P. Krishna et al., Reducing the blocking in two phase commit with backup sites Apr. 15, 2003, Elsevier, pp. 39-47.
IOS Commands, Feb. 6, 2005, Pantz.org, [online], <web.archive.org/web/20050206184604/http://pantz.org/os/ios/ioscommands.shtml>, pp. 1-12 as printed.
IP Forwarding with Cisco Routers Lab Exercises, Jun. 15, 1999 [online], <ws.edu.isoc.org/data1999/1481713642400af6a2de65a/ip_fwd_cisco_config.ppt>, pp. 1-11 as printed.
Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached) total 23 pages.
Yoshitake Shinkai, Cluster File System: HAMFS, Fujitsu, Japan, Fujitsu Limited, Jul. 9, 1999, vol. 50, No. 4, pp. 210 to 214 (stamped Citation 2 / English Translation attached) total 16 pages.
Duchamp, Dan: "Analysis of Transaction Management Performance", ACM Symposium on Operating Systems Principles, pp. 177-190, Dec. 1989.
Silaghi, Raul et al.: "Porting OMTTs to CORBA", Lecture Notes in Computer Science, vol. 2888/2003, pp. 1521-1542, Nov. 2003.
Dorai et al., "Transport Threads: Resource Sharing in SMT Processor for High Single-Thread Performance", proceedings of the 2002 International Conference on Parallel Architectures and Complication Techniques, Sep. 2002, 12 pages.
Peterson, Zachary Nathaniel Joseph, "Data Placement For Copy-On-Write Using Virtual Contiguity," Master of Science in Computer Science Thesis, University of California, Santa Cruz, Sep. 2002, 67 pages.
Oct. 8, 2010 Restriction Requirement in U.S. Appl. No. 12/057,321, filed Mar. 27, 2008.
Nov. 15, 2002 Int'l Search report PCT/US02/24728, 2 pages.
Apr. 20, 2004 Int'l Search report PCT/US03/36699, 10 pages.
Aug. 6, 2004 Int'l Search report PCT/US03/33704, 11 pages.
May 21, 2007 European Search Report EP 02756944.1-2201, 8 pages.
Feb. 22, 2008 Int'l Search report PCT/US07/018326, 20 pages.
May 8, 2008 Int'l Search report PCT/US07/018324, 13 pages.
Philip A. Bernstein, Vassos Hadzilacos, and Nathan Goodman, Concurrency Control and Recovery in Database Systems, Addison-Wesley, 370 pages, 1987.
Kenneth P. Birman, Building Secure and Reliable Network Applications, Manning, 1996, pp. 1-327.
Kenneth P. Birman, Building Secure and Reliable Network Applications, Manning, 1996, pp. 328-619.
Birk, Y., Deterministic load-balancing schemes for disk-based video-on-demand storage servers, Mass Storage Systems 1995; Storage—At the Forefront of Information Infrastructures', Proceedings of the Fourteenth IEEE Symposium on Monterey, CA, Sep. 11-14, 1995, pp. 17-25.
Coulouris et al., Distributed Systems Concepts and Design; Addison-Wesley, Second Edition, 1994, pp. 353-371 and 377-405.
Jim Gray and Andreas Reuter, Transaction Processing: Concepts and Techniques, Morgan Kaufmann, 1993, pp. 1-328.
Jim Gray and Andreas Reuter, Transaction Processing: Concepts and Techniques, Morgan Kaufmann, 1993, pp. 329-664.
Jim Gray and Andreas Reuter, Transaction Processing: Concepts and Techniques, Morgan Kaufmann, 1993, pp. 665-1105.
Kumar Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, Feb. 5, 1990, pp. 446-454, XP010018185 ISBN: 978-0-8186-2025-6 p. 446, left-hand column, line 1-p. 447, last line.
Nancy A. Lynch, Distributed Algorithms, Morgan Kaufmann, 1996, pp. 1-409.
Nancy A. Lynch, Distributed Algorithms, Morgan Kaufmann, 1996 pp. 410-871.
Sape Mullender, editor, Distributed Systems (2nd Ed.), ACM Press/Addison-Wesley Publishing Co., New York, NY, USA, 1993, pp. 1-327.
Sape Mullender, editor, Distributed Systems (2nd Ed.), ACM Press/Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., Transactional Information Systems: Theory, Algorithms, and the Practice of Concurrency Control and Recovery, Morgan Kaufmann, 2002, pp. 1-450.
Gerhard Weikum, et al., Transactional Information Systems: Theory, Algorithms, and the Practice of Concurrency Control and Recovery, Morgan Kaufmann, 2002, pp. 451-863.
Sanjay Ghemawat et al., The Google File System, Symposium on Operating Systems Principles, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Duzett, Bob et al., *An Overview of the nCube 3 Supercomputer*, IEEE, Jul. 1992, pp. 458-464.
Hartman, John Henry, *The Zebra Striped Network File System*, (Sc.B. (Brown University) 1987, pp. 1-148.
Long, Darrell D.E., et al., *Swift/RAID: A Distributed RAID System, Computing Systems*, vol. 7, No. 3 Summer 1994, pp. 333-359.
Stallings, William, Operating Systems, Prentice Hall, Fourth Edition; 2001, pp. 197-253 and 265-293.
Michael Stonebraker et al., Distributed Raid: A New Multiple Copy Algorithm, Proc. Sixth Int. Conf. Data Eng., IEEE Service Center, Piscataway, NJ (IEEE cat No. 90CH2840-7), pp. 430-437, Feb. 5, 1990.
United States Court of Appeals, Federal Circuit, *Seachange International, Inc.* Vs. *nCUBE, Corp.*, Oct. 26, 2004, 28 pages.
United States Court of Appeals, Federal Circuit, *Seachange International, Inc.* Vs. *C-Corp, Inc.*, Jun. 29, 2005, 22 pages.
United States District Court, Delaware, *Seachange International, Inc.* Vs. *nCUBE, Corp.*, Apr. 7, 2004, 13 pages.
United States District Court, Delaware, *Seachange International, Inc.* Vs. *nCUBE, Corp.*, Aug. 29, 2000, 12 pages.

Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 7, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (exhibits listed separately below), 1 page.
Isilon Systems, "Isilon IQ Plateform Overview", 4 pages, 2007 (Exhibit A).
Isilon Systems, "Uncompromising Reliability through Clustered Storage", Sep. 2006, 10 pages (Exhibit B).
BYTEANDSWITCH, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Arthur S. Rose, Letter to Steven M. Bauer, Aug. 31, 2007, 4 pages.
Ramez Elmasri, Fundamentals of Database Systems 3rd ed, Sep. 30, 1999, Addison-Wesley, pp. 155, 169, 171, 172, 173, 178, 181, 182, 381, 771.
MCSA/MSCE/MCDBA Self Paced Training Kit: MS SQL Server 2000 System Administration, May 14, 2003, Microsoft Press, Second Edition, 12 pages.
Supp EPO Search Report, App. No. EP 03 78 3599; dated Apr. 29, 2008, 2 pages.
Levy E., Ed.—Institute of Electrical and Electronic Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of Euromicro Workshop On Multimedia and Telecommunications, vol. 2, Sep. 5, 2000, pp. 96-101.
Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.
Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.

* cited by examiner

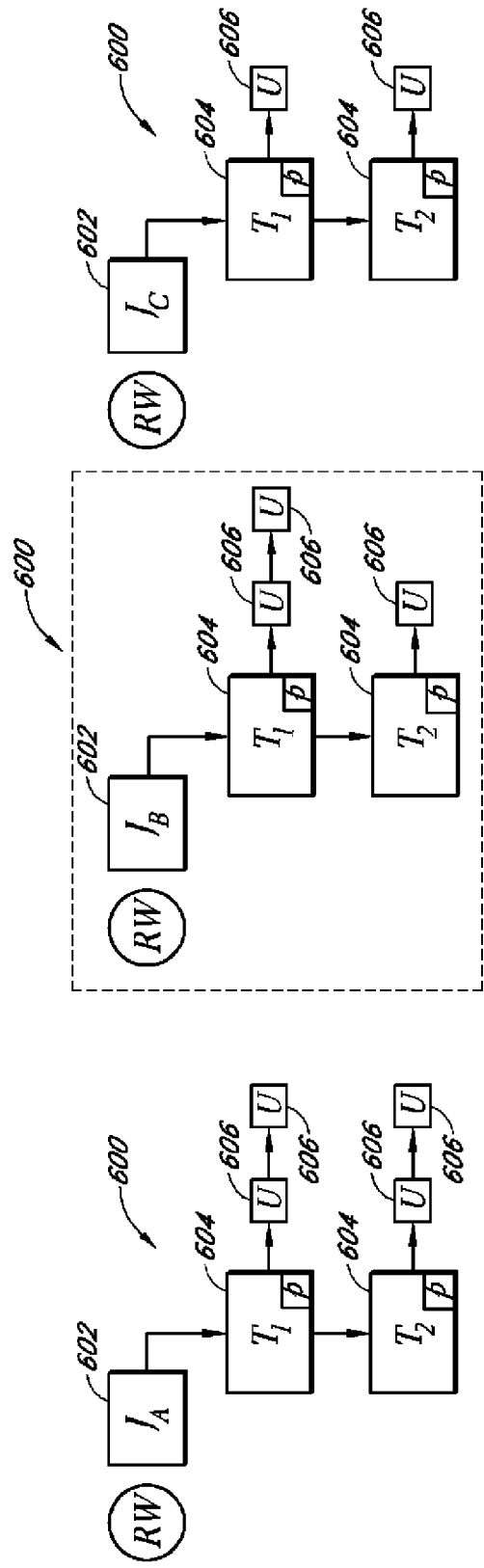
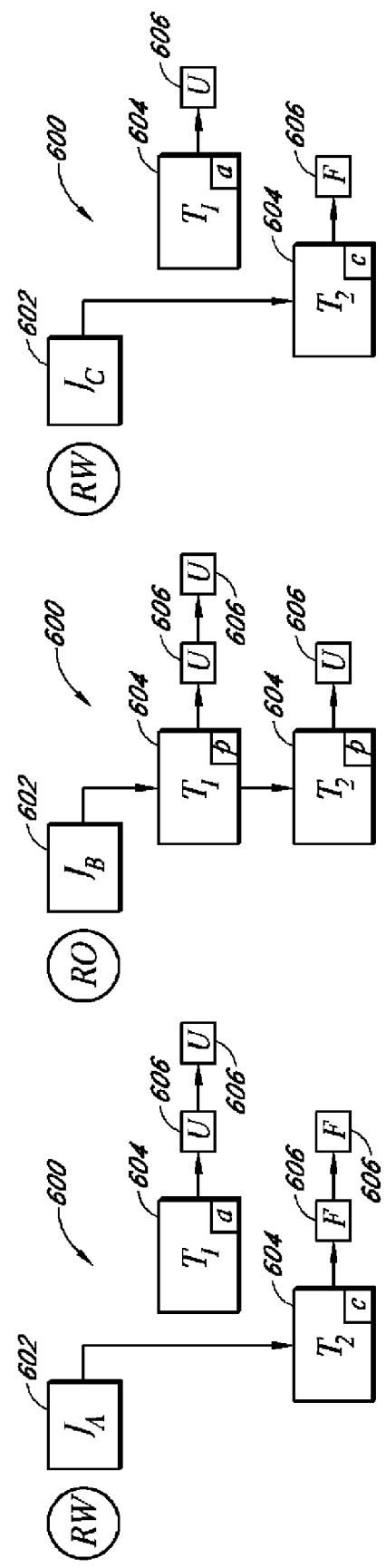
FIG. 6A
FIG. 6B

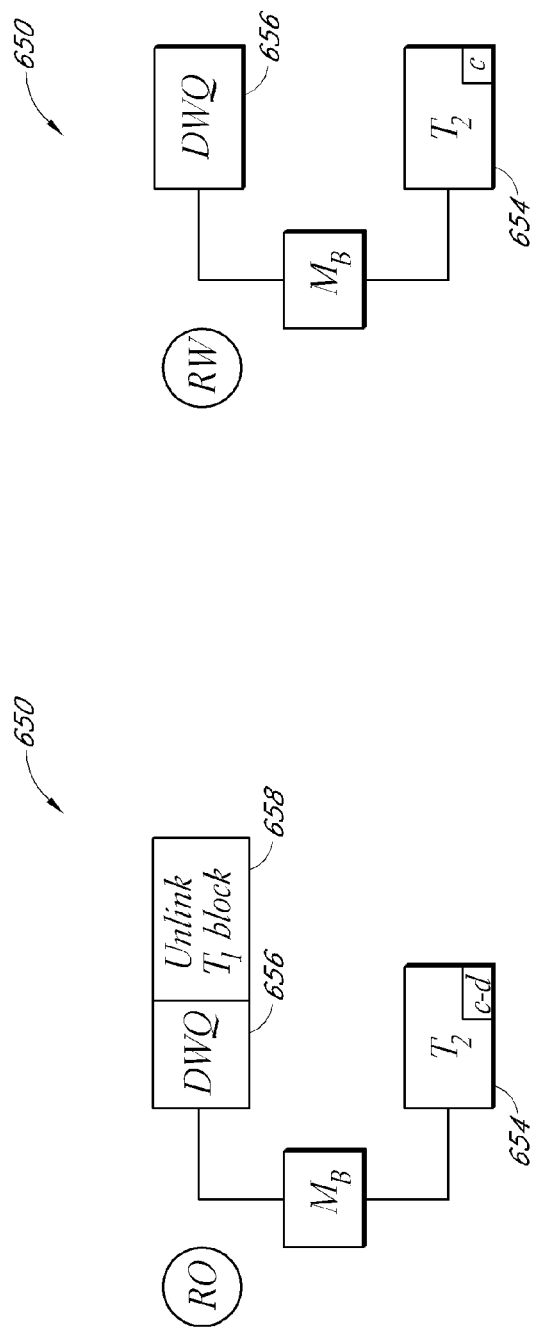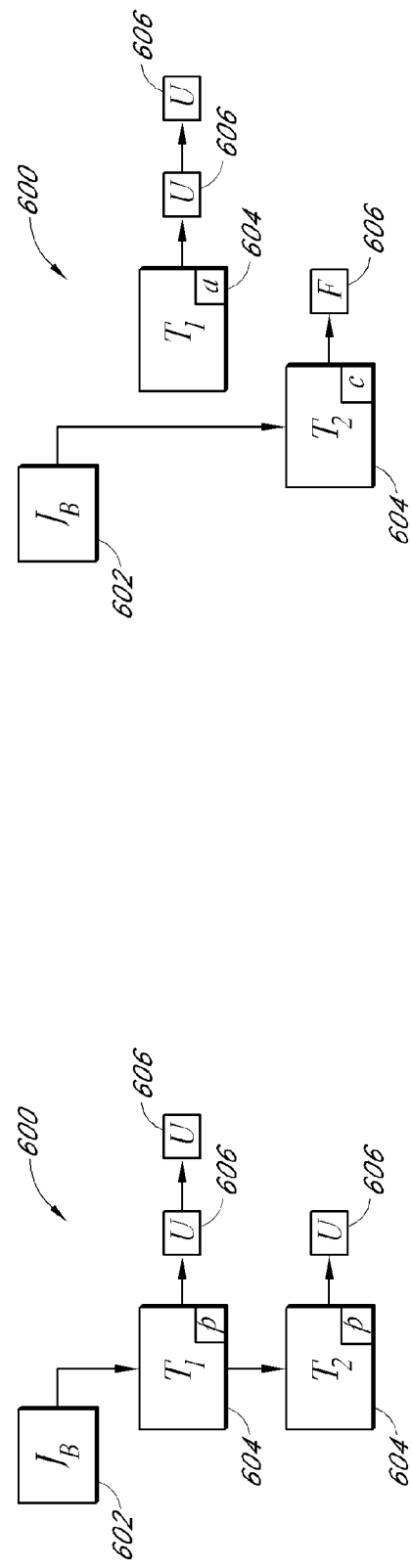
FIG. 6D
FIG. 6C

SYSTEMS AND METHODS FOR A READ ONLY MODE FOR A PORTION OF A STORAGE SYSTEM

CROSS-REFERENCED APPLICATIONS

This application was filed on the same day as the following applications: U.S. patent application Ser. No. 12/057,298, entitled "SYSTEMS AND METHODS FOR MANAGING STALLED STORAGE DEVICES" U.S. patent application Ser. No. 12/057,302, entitled "SYSTEMS AND METHODS FOR MANAGING STALLED STORAGE DEVICES", and U.S. patent application Ser. No. 12/057,321, entitled "SYSTEMS AND METHODS FOR A READ ONLY MODE FOR A PORTION OF A STORAGE SYSTEM", all of which are hereby incorporated by reference in their entirety.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND

1. Field of the Disclosure

In general, embodiments relate to reading data from and writing data to a storage system. Specifically, embodiments relate to a read only mode for a portion of a storage system.

2. Description of the Related Art

The increase in processing power of computer systems has ushered in a new era in which information is accessed on a constant basis. In many computing environments, storage systems are in continuous, or near-continuous, use. During such use, storage systems may experience conditions that negatively affect the durability of data in the storage system. For example, servicing a storage system may place certain storage components at risk by creating a possibility of an inadvertent loss of power to one or more of the storage components.

SUMMARY OF THE DISCLOSURE

Because only some of the components of the storage system may be affected by the dangerous condition, it may be preferable to allow the storage system to isolate its response to the dangerous condition. Hence, there is a need for responding to conditions that may negatively affect a portion of the storage system while allowing the remainder of the storage system to operate normally. In general, embodiments of the invention relate to reading data from and writing data to a storage system. Specifically, embodiments of the invention relate to a read only mode for a portion of a storage system.

In one embodiment, a method of implementing a selective read-only mode in a storage system is disclosed. The method includes monitoring a condition that affects a subset of persistent storage in a storage system; detecting the condition; entering a read-only mode for the subset; and enforcing a policy of processing write requests and read requests to the storage system, which policy includes processing the write requests without modifying user data stored on the subset and processing the read requests, including requests for user data stored on the subset.

In another embodiment, a computer-readable medium having instructions stored thereon is disclosed. The instructions including the method of implementing a selective read-only mode in storage system described above.

In yet another embodiment, a distributed storage system configured to implement a selective read-only mode is disclosed. The distributed storage system includes a plurality of storage modules configured to communicate via a network, each of the plurality of storage modules configured to process at least one of read and write requests on behalf of the entire distributed storage system, wherein the storage modules configured to handle write requests are configured to individually enter a read-only mode if at least one condition is detected that affects persistent storage on a respective storage module; and an allocation module configured to exclude storage modules operating in read-only mode from processing write requests.

In yet another embodiment, a storage module configured to communicate with other storage modules and to enter a read-only mode is disclosed. The storage module includes persistent storage with user data stored thereon; memory with temporary data stored thereon; a monitoring module configured to detect at least one condition that affects the persistent storage; a read-only module configured to place the storage module into a read-only mode after the monitoring module detects the at least one condition.

In yet another embodiment, a method of implementing a selective read-only mode in a storage system with a transaction journal is disclosed. The method includes: monitoring a condition that affects data stored in a transaction journal corresponding to a portion of a storage system, wherein the transaction journal records in a persistent storage transactions that modify user data stored in the portion; detecting the condition; entering a read-only mode for the portion of the storage system; enforcing a policy of processing write requests and read requests to the storage system, which policy includes processing the write requests without modifying user data on the portion and processing the read requests, including requests for user data stored on the portion.

In yet another embodiment, a computer-readable medium having instructions stored thereon is disclosed. The instructions including the method of implementing a selective read-only mode in storage system with a transaction journal described above.

In yet another embodiment, a distributed storage system configured to implement a selective read-only mode is disclosed. The distributed storage system includes: a plurality of storage modules configured to communicate via a network, each of the plurality of storage modules configured to process at least one of read and write requests on behalf of the entire distributed storage system, wherein the storage modules configured to handle write requests are configured to individually enter a read-only mode if at least one condition is detected that affects data stored in a transaction journal corresponding to a portion of a storage system, wherein the transaction journal records in persistent storage transactions that modify user data stored in the portion; and an allocation module configured to exclude storage modules operating in read-only mode from processing write requests.

In yet another embodiment, a storage module configured to communicate with other storage modules and to enter a read-only mode is disclosed. The storage module includes: a first persistent storage with user data stored thereon; a second persistent storage with transaction data stored thereon; memory with temporary data stored thereon; a monitoring module configured to detect at least one condition that affects the second persistent storage; a read-only module configured to place the storage module into a read-only mode after the monitoring module detects the at least one condition.

In yet another embodiment, a method of entering a read-only mode for a portion of a storage system is disclosed. The method includes: marking as unwritable a transaction journal associated with a portion of a storage system entering a read-only mode; backing up the transaction journal without writing to the portion; continuing to process unresolved transactions affecting the portion by marking as commit deferred, without writing to the transaction journal, those transactions for which a commit message is received after entering the read-only mode; and processing those transactions marked commit deferred, after leaving the read-only mode for the portion, by marking each of those transactions as committed in the transaction journal, and sending committed messages to other affected portions of the storage system.

In yet another embodiment, a computer-readable medium having instructions stored thereon is disclosed. The instructions including the method of entering a read-only mode for a portion of a storage system described above.

For purposes of this summary, certain aspects, advantages, and novel features are described herein. It is to be understood that not necessarily all such advantages may be achieved in accordance with any particular embodiment. Thus, for example, those skilled in the art will recognize that the systems and methods may be embodied or carried out in a manner that achieves one advantage or group of advantages as taught herein without necessarily achieving other advantages as may be taught or suggested herein. Furthermore, embodiments may include several novel features, no single one of which is solely responsible for the embodiment's desirable attributes or which is essential to practicing the systems and methods described herein. Additionally, in any method or process disclosed herein, the acts or operations of the method or process may be performed in any suitable sequence and are not necessarily limited to any particular disclosed sequence.

BRIEF DESCRIPTION OF THE DRAWINGS

FIGS. 6A and 6B illustrate a problem that arises when entering a read-only mode with unresolved transactions in some embodiments.

FIGS. 6C and 6D illustrate one embodiment of a protocol for deferring operations associated with unresolved transactions during a read-only mode.

Figure 1:
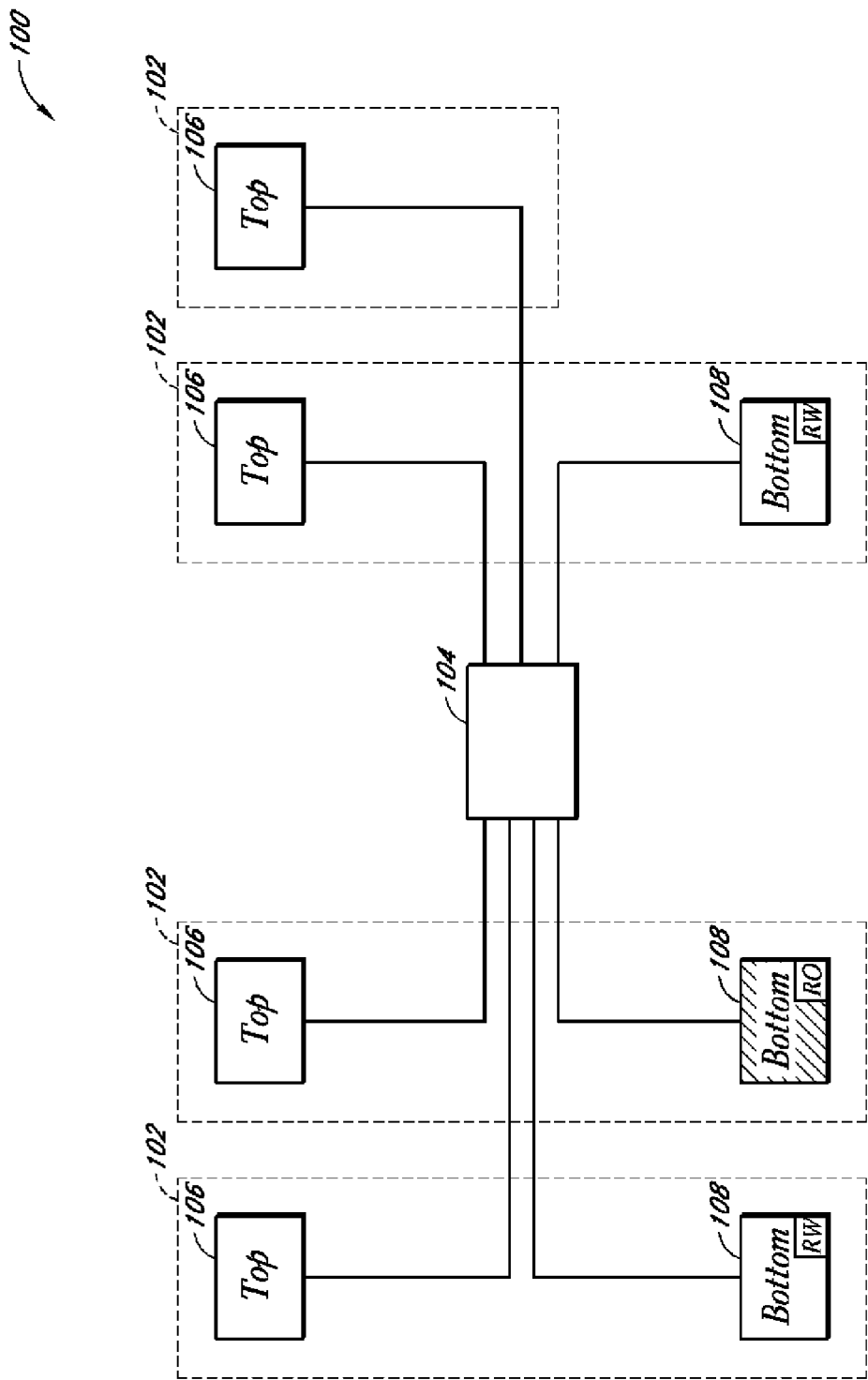
FIG. 1 illustrates one embodiment of a storage system configured to implement a read-only mode for a portion of the storage system.

These and other features will now be described with reference to the drawings summarized above. The drawings and the associated descriptions are provided to illustrate embodiments of the invention and not to limit the scope of the invention. Throughout the drawings, reference numbers may be re-used to indicate correspondence between referenced elements. In addition, the first digit of each reference number generally indicates that figure in which the element first appears.

DETAILED DESCRIPTION OF PREFERRED EMBODIMENTS

Systems and methods which represent one embodiment of an example application of the invention will now be described with reference to the drawings. Variations to the systems and methods which represent other embodiments will also be described.

For purposes of illustration, some embodiments will be described in a context of a distributed file system. Embodiments of a distributed file system suitable for accommodating embodiments of a read only mode for a portion of a storage system disclosed herein are disclosed in: U.S. patent application Ser. No. 10/007,003, titled, "SYSTEMS AND METHODS FOR PROVIDING A DISTRIBUTED FILE SYSTEM UTILIZING METADATA TO TRACK INFORMATION ABOUT DATA STORED THROUGHOUT THE SYSTEM," filed Nov. 9, 2001, which claims priority to Application No. 60/309,803 filed Aug. 3, 2001; U.S. patent application Ser. No. 10/281,467 entitled "SYSTEMS AND METHODS FOR PROVIDING A DISTRIBUTED FILE SYSTEM INCORPORATING A VIRTUAL HOT SPARE," filed Oct. 25, 2002, which issued as U.S. Pat. No. 7,146,524, on Dec. 5, 2006; and U.S. patent application Ser. No. 10/714,326 entitled "SYSTEMS AND METHODS FOR RESTRIPING FILES IN A DISTRIBUTED FILE SYSTEM," filed Nov. 14, 2003, which claims priority to Application No. 60/426,464, filed Nov. 14, 2002, all of which are hereby incorporated by reference herein in their entirety.

The present invention is not limited by the type of environment in which the systems and methods are used, however, and systems and methods may be used in other environments, such as, for example, other file systems, other distributed systems, the Internet, the World-Wide Web, a private network for hospitals, a broadcast network for a government agency, and an internal network for a corporate enterprise, an intranet, a local area network (LAN), a wide area network (WAN), a wired network, a wireless network, and so forth. Furthermore, some embodiments of the invention may include distributed databases and other distributed systems.

Some of the figures and descriptions, however, relate to embodiments of a distributed file system. It is also recognized that, in some embodiments, the systems and methods disclosed herein may be implemented as a single module and/or implemented in conjunction with a variety of other modules and the like. Furthermore, the methods and processes disclosed herein may be embodied in, and fully automated via, software code modules executed by one or more computers or processors. Computer code modules may comprise computer readable mediums with instructions stored thereon. The code modules may be stored in any type of computer-readable medium or other computer storage device. Some or all of the systems and methods may alternatively be embodied in specialized computer hardware. Moreover, the specific implementations described herein are set forth in order to illustrate, and not to limit, the invention.

The word module refers to logic embodied in hardware or firmware, or to a collection of software instructions, possibly having entry and exit points, written in a programming language, such as, for example, C or C++, and stored in a computer-readable medium. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

I. Overview

In general, embodiments relate to reading from and writing to data storage systems. Specifically, embodiments implement a read-only mode for a portion of a data storage system. In some circumstances, it may be advantageous for a data storage system to enforce a read-only mode for only a portion of the system. A portion-specific read-only mode may provide an efficient solution in various circumstances. During a portion-specific read-only mode, read operations may be processed on the entire storage system, and write operations may be processed except on the portion in a read-only mode. Thus, a portion-specific read-only mode allows for an efficient way to prevent writing to only a portion of a storage system when it may be advantageous to prevent writing to that portion, to permit writing to the remaining portions, and/or to permit reading from the entire storage system.

In some circumstances, a portion-specific read-only mode may be advantageous when it is possible that certain components of the system may affect only a portion of the system without affecting another portion of the system in the same way. For example, in a distributed storage system that includes a cluster of data storage nodes, a power supply for one of the nodes may affect that node without directly affecting the other nodes. In some circumstances, a loss of power may lead to the loss of data that would compromise the reliability and/or consistency of a data storage system. Thus, it may be advantageous to detect conditions indicating that a subsequent power loss would be likely to result in lost data for a particular node. When such a condition is detected, it may then be advantageous to enter a read-only mode for that node to prevent such data loss. For example, in a read-only mode, a node might make a permanent backup copy (unaffected by a subsequent power loss) and then prevent subsequent writes to data that would be affected by a subsequent power loss. Preventing subsequent writes to the jeopardized data ensures that the backup copy is consistent in the event that it is used to restore data following a subsequent power loss. Enforcing the read-only mode for just that node allows the remaining portions of the system (unaffected by a subsequent power loss) to continue as normal and also allows the affected node to participate in read operations. A node-level, read-only mode, therefore, allows a system, for example, to take precautionary measures for only the affected portions of the system. Such narrowly tailored responses permit a system, for example, to provide efficient safety precautions—ensuring data integrity, while allowing as much functionality as may be prudent in the circumstances. One skilled in the art will appreciate that there are many suitable circumstances in which a portion-specific, read-only mode may be implemented for a data storage system.

A description of an example architecture in which embodiments may be implemented will first be described. Then, a problem that arises when a portion of journal data is lost will be described. Next, a description of certain conditions that may negatively affect the durability of a portion of storage system will be described. Various embodiments of storage systems with identifiable portions will then be described. Next, there will be a description of a process for writing data to a storage system when a portion of the system is operating in a read-only mode. Because entering a read-only mode with unresolved transactions presents a particular problem, this problem and embodiments of a possible solution will then be described. Finally, processes for implementing the embodiments described herein will then be described.

II. System Architecture

FIG. 1 illustrates one embodiment of a storage system with a read-only mode for a portion of the system. In the illustrated embodiment, the distributed storage system 100 includes a cluster of four nodes 102, storage modules with processors and at least one storage device, connected via a switched network 104. Although in the illustrated embodiment the distributed system 100 is connected via a switched network 104, in other embodiments the distributed storage system may be connected in different ways, including, for example, direct wired connections between the nodes of the storage system. The nodes 102, storage modules, of distributed storage system 100 are divided conceptually into top halves 106 and bottom halves 108. Top halves 106 handle requests for the distributed storage system 100. For example, top halves 106 receive requests to deliver the contents of data stored under the distributed storage system 100, and then satisfy those requests by communicating the requested data to the respective requesters.

The bottom halves 108 manage the distribution of data across the distributed storage system 100. For example, the bottom halves 108 operate the storage of data by distributing portions of a file, for example, across the nodes 102. Some of the nodes 102 operate exclusively with the functionality of a top half 106. These nodes, for example, handle requests to the file system, but do not participate in the storage of data on the distributed storage system 100. The distributed storage system 100 provides a node-level read-only mode. When a node 102 is in a read-only mode, the bottom half 108 participates in answering read requests, but does not participate in handling write requests. For write requests, the remaining nodes 102 handle the requests. In general, top halves 106 are not affected by the node-level read-only mode. In other embodiments, top halves 106 or other portions of nodes 102 may also be affected.

In general, the distributed storage system 100 may include a variety of computer systems such as, for example, a computer, a server, a smart storage unit, and so forth. In one embodiment, the computer may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Palm Pilot OS, Apple® MacOS®, Disk Operating System (DOS), UNIX, IRIX, Solaris, SunOS, FreeBSD, Linux®, or IBM® OS/2® operating systems.

III. Losing Journal Data

During the operation of a distributed storage system, conditions arise that may negatively affect the durability of persistent storage. Persistent storage may be any suitable storage medium for storing the contents of data when a main power supply source is unavailable. For example, persistent storage may include non-volatile random access memory (NVRAM), flash memory, hard-disk drive, compact-disc read-only memory (CD-ROM), digital versatile disc (DVD), optical storage, and magnetic tape drive. Persistent storage itself may depend on power supplies. Thus, the term persistent may be a relative term, in that some storage is persistent relative to a certain condition, such as the loss of a main power supply. For example, NVRAM may be battery-backed random access memory that persists even when a main power supply is unavailable. Persistent storage may also be independent of power supplies in general, such as flash memory, hard-disk drives, CD-ROMs, DVDs, optical storage devices, and tape drives. One skilled in the art will appreciate many suitable mediums for persistent storage.

Figure 2:
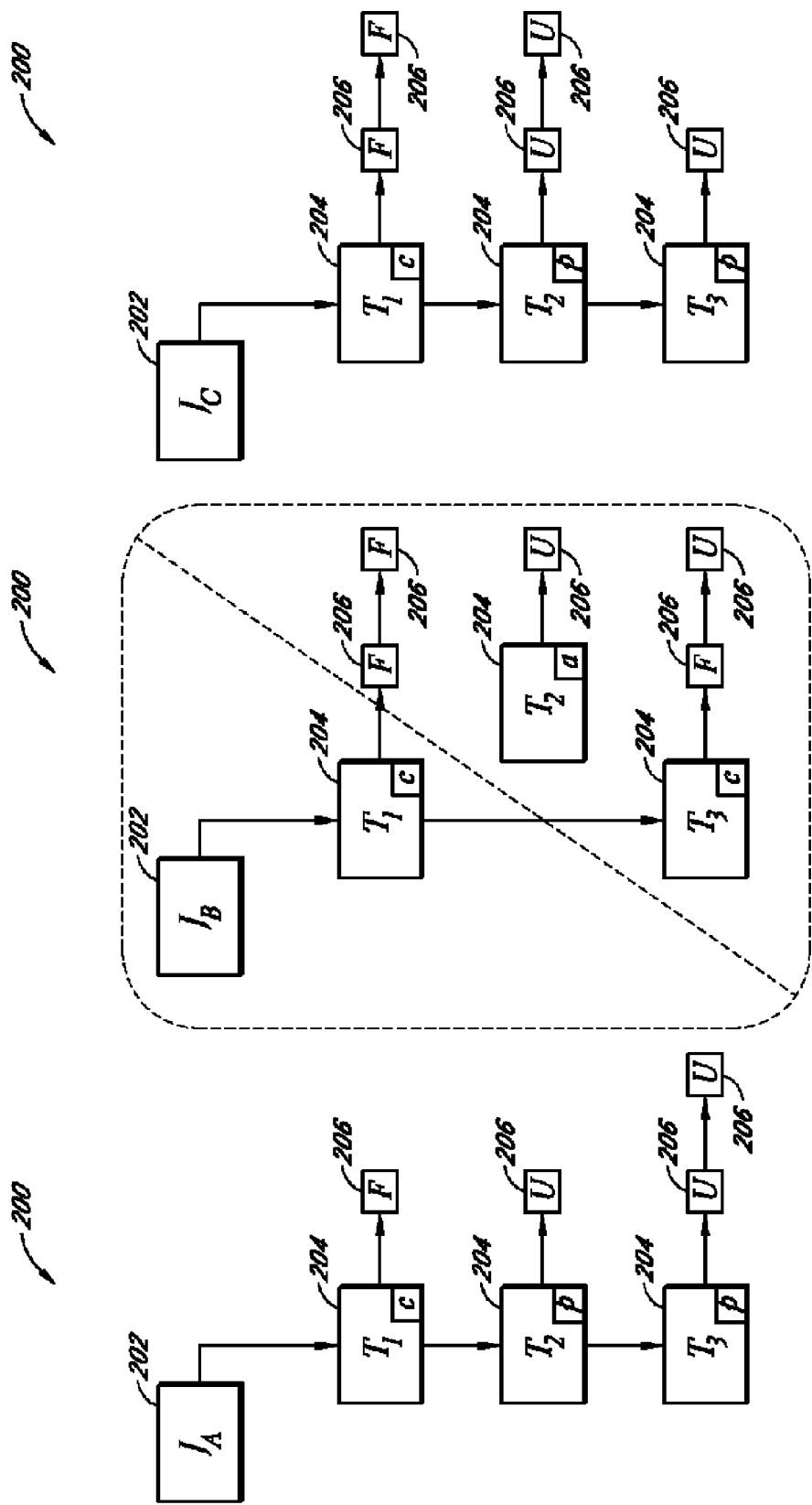
FIG. 2 illustrates one embodiment of a problem that arises when a portion of journal data is lost.

When the durability of persistent storage is negatively affected, a storage system may become unreliable. For example, some persistent storage components may store a write journal that keeps track of write transactions in a storage system. FIG. 2 illustrates one embodiment of a problem that arises when a component storing journaled data loses power and the contents of the journal are lost. Data journals keep records of write transactions until the respective data has been completely written to a permanent storage location. For example, many hard-disk drives employ write caches to temporarily store data while the disk drive rotates the magnetic disks and encodes data values. If a hard-disk drive loses power before the contents of its write cache have been written to the disk platters, then the hard disk drive will be in an inconsistent state because the storage system expects that the data has been written, but in reality, the data has been lost. By keeping a data journal, the contents of the hard disk drive can be written again after a power failure. This is because a data journal may be kept in non-volatile memory, which persists even after a power failure. Embodiments of a data journal for accommodating embodiments of a read only mode for a portion of a storage system disclosed herein are disclosed in: U.S. patent application Ser. No. 11/506,597, titled, "SYSTEMS AND METHODS FOR PROVIDING NONLINEAR JOURNALING," filed Aug. 18, 2006; U.S. patent application Ser. No. 11/507,073, titled, "SYSTEMS AND METHODS FOR PROVIDING NONLINEAR JOURNALING," filed Aug. 18, 2006; U.S. patent application Ser. No. 11/507,070, titled, "SYSTEMS AND METHODS FOR PROVIDING NONLINEAR JOURNALING," filed Aug. 18, 2006; and U.S. patent application Ser. No. 11/507,076, titled, "SYSTEMS AND METHODS FOR ALLOWING INCREMENTAL JOURNALING," filed Aug. 18, 2006; all of which are hereby incorporated by reference herein in their entirety.

If the contents of a data journal are lost, however, the data storage system may reach an inconsistent state even if the remaining components are not affected. In some embodiments, data journals kept in non-volatile memory are subject to failure if the batteries supplying the non-volatile memory are interrupted. For example, many non-volatile memory components are backed up with power supplies, such as batteries, that are independent from the power source of the storage system, or from a portion of the storage system. Separate batteries, for example, may supply power to the non-volatile memory, allowing the contents to persist even when other components of the data storage system lack power. If these independent batteries are interrupted, however, then the journaled data may be lost when, for example, there is a loss of main power supply and there is no backup power supply.

FIG. 2 illustrates the consequences of losing journaled data. The journals 200 correspond to three separate portions of a storage system: portion A, portion B, and portion C. These portions are referred to, respectively, as $Node_A$, $Node_B$, and $Node_C$, which are three storage modules acting collectively to implement the storage system. Journals 200 include a record of three different transactions. The transactions have different data blocks spread across the three different portions, the nodes, of the storage system. Transaction blocks 204 correspond to one of the three transactions and keep a record of the respective transaction states such as "prepared," "aborted," and "committed." Data blocks 206 include the data to be written to permanent storage, such as hard-disk drives, and are either flushed or unflushed. Unflushed data blocks 206 persist until they have been flushed. Flushed data blocks may be unlinked from the transaction, as their contents have been recorded in permanent storage. Although a journal does not keep a permanent record of data, losing the contents of a journal may cause the storage system to have an inconsistent state.

FIG. 2 illustrates how losing $Journal_B$ 200 would affect the contents of the storage system. The transaction blocks 204 corresponding to $Journal_A$ 200 and $Journal_C$ 200 have the same recorded transaction states for all three transactions. $Journal_B$ 200, however, has a different transaction state for two of the three transactions. This may be the result of $Node_B$ having been a coordinator and/or initiator for the respective transactions. Transaction protocols involving coordinators and/or initiators are described in greater detail below with reference to FIGS. 7A, 7B, and 8.

$Journal_B$ 200 reports that transaction $T_2$ has been aborted. In some embodiments, an aborted transaction may be marked aborted in its respective transaction block 204. Furthermore, in some embodiments, an aborted transaction may be unlinked from a transaction list. In the illustrated embodiment, the aborted transaction is unlinked from the list and marked aborted for clarity, though one skilled in the art will appreciate that an unlinked transaction may not be marked as aborted. If the information that transaction $T_2$ aborted is lost during, for example, a power failure affecting $Journal_B$, $Node_A$ and $Node_C$ will be unaware. Furthermore, when $Node_B$ comes back on line, $Node_A$ and $Node_C$ will not be able to communicate to $Node_B$ that transaction $T_2$ aborted. With respect to transaction $T_3$, only $Journal_B$ 200 reported that the transaction had committed. One of its data blocks 206 has also been flushed to disk, meaning that the permanent contents of the disk record the data corresponding to the transaction. If the journaled data in $Journal_B$ 200 is lost, $Node_A$ and $Node_C$ will not know that transaction $T_3$ committed. Thus, the data storage system will be in an inconsistent state.

Because losing journaled data may affect the reliability and/or consistency of a data storage system, it may be advantageous to detect conditions that may negatively affect the persistent storage components that stores journaled data. Furthermore, once such a condition is detected, it may be advantageous to take actions that would prevent the permanent loss of journaled data in the event that the persistent storage components lose their data. For example, it may be advantageous for a node in a distributed storage system to enter a read-only mode when a condition is detected that may lead to the failure of that nodes' persistent storage for journaled data. A read-only mode may provide a consistent state to which the journal may be restored after a failure affecting the persistent storage storing the journal. In some embodiments, a read-only module may cause a portion of a storage system to enter a read-only mode.

For example, entering the read-only mode may include waiting until transactions in the node's journal sufficiently resolve, marking the node's journal as unwritable, and backing up the contents of the node's journal. In read-only mode, subsequent write transactions are prevented from modifying the node's journal. Processing write transactions in a data storage system implementing a portion-specific read-only mode is discussed in greater detail below with respect to FIGS. 5A and 5B. If that node's persistent storage for the journal then fails, the backup copy of the journal can be used because the backup is consistent with the lost journal data, which was not modified during the read-only mode.

As discussed above, entering a read-only mode may include waiting until transactions in the node's journal sufficiently resolve. Determining when a transaction has sufficiently resolved may depend on the transaction protocol used to resolve the transactions. Transaction protocols suitable for implementing the embodiments described herein are disclosed in: U.S. patent application Ser. No. 11/262,306, titled, "NON-BLOCKING COMMIT PROTOCOL SYSTEMS AND METHODS," filed Oct. 28, 2005, which is incorporated by reference herein in its entirety. In some embodiments, transactions have sufficiently resolved when they are either aborted or committed. In some embodiments, if a transaction has not resolved into an aborted or committed state—that is, the transaction is in, for example, a prepared state—it may be disadvantageous to prevent writes to the journal during the read-only mode. For example, if a transaction is in a prepared state when a journal is marked unwritable, the transaction may not resolve during the read-only mode, which may prevent the other nodes from processing the transaction. Thus, it may be advantageous to allow transactions to resolve before marking a node's journal as unwritable and saving a backup copy.

Enforcing a node-level read-only mode is advantageous because it allows a portion of the system to respond to conditions that may only affect journal data for a portion of the system. During the read-only mode, the node may continue to participate in read transactions and the remainder of the system can participate in both read and write transactions. One skilled in the art will appreciate that a portion-specific, read-only mode may be advantageous for other circumstances in addition to possible loss of journaled data.

IV. Detecting Conditions

As described above, it may be advantageous to enter a portion-specific read-only mode when certain conditions are detected that affect a particular portion of a storage system. In some embodiments, a monitoring module may detect certain conditions that trigger a read-only mode.

In some embodiments, it may be advantageous to respond to conditions that may affect the durability of power supplies providing back-up power to non-volatile random access memory ("NVRAM"). One skilled in the art will appreciate that there are various suitable ways to provide a backup power supply, including batteries. Furthermore, it will be appreciated by one skilled in the art that there are many ways in which the durability of NVRAM may be negatively affected. For example, the power supply of NVRAM may be hot-swappable, meaning that, for example, batteries can be replaced without interrupting the use of the memory. During a hot-swap, the non-volatile memory effectively becomes volatile memory, and the contents of the memory are temporarily unprotected. Opening the chassis of a storage node is another condition that creates the possibility for NVRAM to be negatively affected. For example, while the chassis is opened in order to service cooling fans, there is a possibility that the backup power supply for the NVRAM may become disconnected. Once disconnected, the non-volatile memory effectively becomes volatile memory and the contents of the memory are temporarily unprotected should power to the node cease. Weak or failing power supplies, such as weak or failing batteries, are another condition that may negatively affect the durability of NVRAM. If the backup power supply for NVRAM becomes too weak or ceases to function altogether, then the non-volatile memory effectively becomes volatile memory and the contents are unprotected in the event of a power failure which would cause the loss of data.

Although the conditions described above are directed to detecting conditions that negatively affect backup power supplies, there are also other conditions that may negatively affect the durability of a portion of a storage system, as well as other conditions that might trigger entry into a read-only mode. In general, embodiments described herein may include any relevant hardware failure that could negatively affect the durability of a portion of a storage system, as well as any other relevant reason for entering a read-only mode, such as a decision by a user to enter a read-only mode. For example, in some embodiments, an NVRAM component may be backed up with flash memory. Thus, some embodiments may monitor for conditions that negatively affect the back-up flash memory. As another example, non-volatile memory components may have support for auto-correcting single-bit errors. If the number of single-bit errors being corrected is high enough, it may indicate a higher likelihood of device failure. Thus, some embodiments may monitor for high error rates. Furthermore, although the conditions described above are directed to detecting conditions that negatively affect backup power supplies, some embodiments may monitor conditions related to the health of the main power supplies. For example, in some embodiments, storage system devices may have redundant power supplies. If one of the power supplies fails, then there is an increased likelihood of relying on the backup power supplies supporting the non-volatile memory. Thus, some embodiments may monitor for conditions related to the health of the main power supplies.

Figure 3:
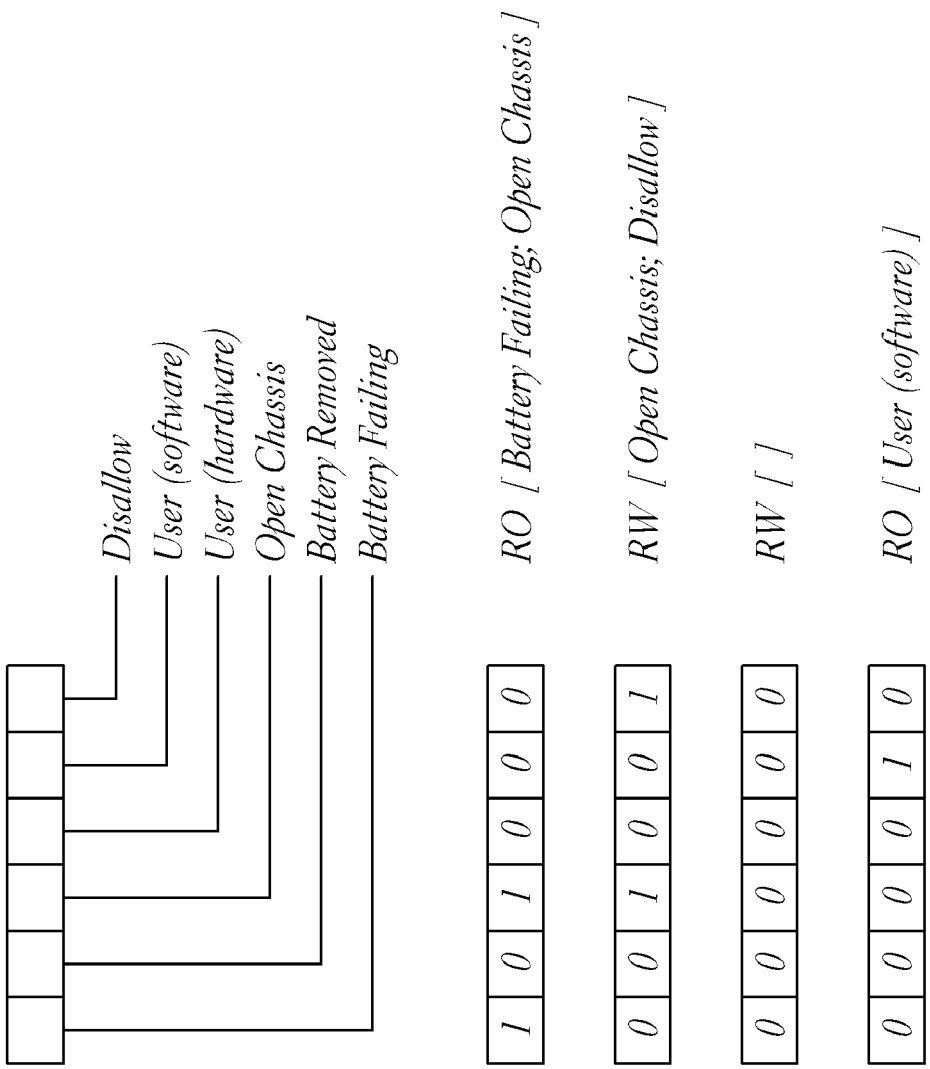
FIG. 3 illustrates one embodiment of a string of bits that reflect conditions that may negatively affect a portion of the storage system.

FIG. 3 illustrates one embodiment of a set of bits used to reflect the status of conditions that may negatively affect the durability of portions of the data search system. For example, in some embodiments, three of the conditions discussed above—a removed battery, an open chassis, and a failed battery—may be assigned a single bit to reflect whether the condition is present. In some embodiments, there may be a bit corresponding to each one of the monitored conditions. For example, in a cluster of four nodes, each node may have a corresponding bit to reflect whether the chassis of the respective node has been opened, or whether the batteries corresponding to the non-volatile memory in the respective node had been removed or are failing. In some cases, more than one condition may be present or no conditions may be present. In some embodiments, users may be able to trigger a read-only mode by selecting the mode from a graphical user interface (GUI) as well as from a hardware interface, such as a button on a device. In some embodiments, it is also possible to disallow portions of the data storage system from entering a read-only mode. This "disallow" feature may be imposed based on system defaults or may be configurable by the administrator or may be selected by an individual user, as well as other possible implementations.

FIG. 3 illustrates several examples of bits string reflecting conditions that may determine whether a portion of the file system is placed in a read-only mode. The first example is a bit string of "101000." The bit string signifies that the "Battery Failing" condition and the "Open Chassis" condition are both satisfied. The presence of these two conditions triggers, in the illustrated embodiment, the read-only mode for the corresponding portion of the storage system. In the second example, the bit string is "001001." The "Open Chassis" condition is satisfied and the "Disallow" condition is also satisfied. Thus, although the "Open Chassis" condition is satisfied, because the "Disallow" condition is also satisfied, the corresponding portion of the storage system remains in a read-write mode. In the third example, the bit string is "000000." Because none of the conditions are satisfied, in the illustrated embodiment, the corresponding portion of the data storage system is in a read-write mode. In the fourth example, the bit string is "000010." The "User (software)" condition is satisfied, meaning that a user has selected through a software interface to trigger the read-only mode.

One skilled in the art will appreciate that there are various suitable ways to use a bit string in connection with transitioning a portion of a storage system to a read-only mode. For example, a bit string may reflect the current status of conditions. Various processes may evaluate the bit string in order to execute appropriate operations in response to the presence or absence of particular conditions. Additionally and/or alternatively, various processes may set the bits in the string after detecting the condition and initiating operations in response to the presence or absence of particular conditions. Bitwise operations, such as the logical "OR" command, may be used, for example, to determine whether to execute certain operations. One skilled in the art will appreciate that other suitable operations on the bit string may be used, and that there are other suitable uses for the bit string than those enumerated herein.

V. Hardware Configurations

FIGS. 4A, 4B 4C and 4D illustrate different hardware configurations of various embodiments of a storage system that implements the read-only mode for a portion of the storage system.

Figure 4D:
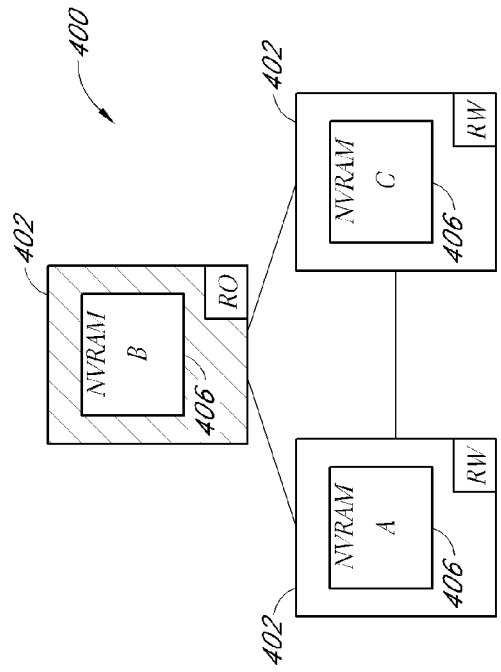
FIGS. 4A, 4B, 4C, and 4D illustrate embodiments of a read-only mode for a portion of a storage system.
Figure 4C:
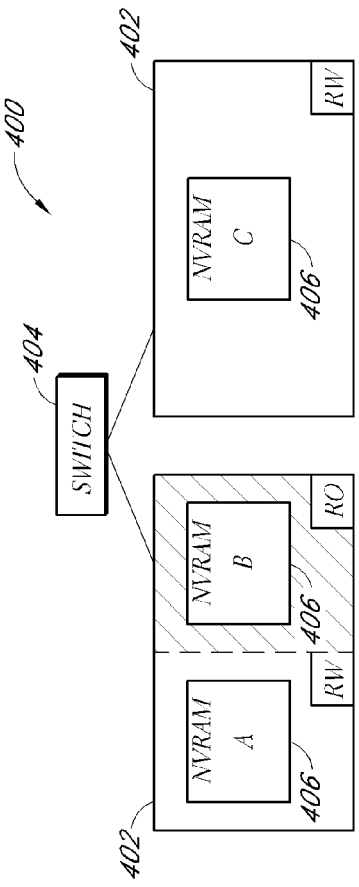
Figure 4A:
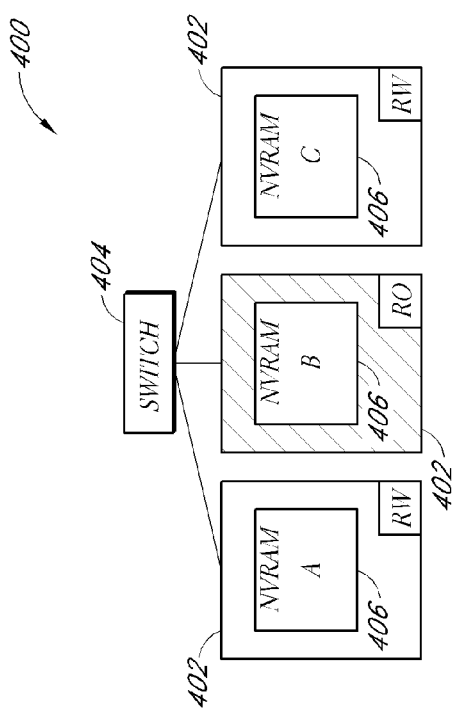

FIG. 4A illustrates a data storage system 400 that includes three data storage nodes 402 connected via a switched network 404. There is a non-volatile memory component 406 corresponding to each of the data storage nodes 402. The data storage system 400 is configured to implement a node-level read-only mode. In the illustrated embodiment, node B is in a read-only mode. The contents of non-volatile memory 406 corresponding to node B, therefore, may not be modified.

Figure 4B:
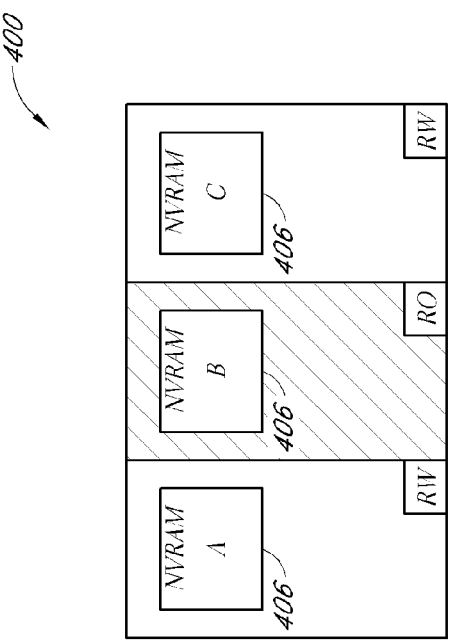

FIG. 4B illustrates a data storage system 400 that comprises a single unit. The data storage system 400 includes three non-volatile memory components 406 that correspond to three different portions of data storage system 400. Data storage system 400 is capable of implementing a read-only mode for each of the three different portions. In the illustrated embodiment, portion B is in a read-only mode. Thus, the contents of non-volatile memory component 406 corresponding to portion B may not be modified.

FIG. 4C illustrates a data storage system 400 comprising two data storage nodes 402 connected via a switched network 404. One of the data storage nodes 402 includes two non-volatile memory components 406, and the other data storage node 402 comprises only one non-volatile memory component 406. In the illustrated embodiment, each of the non-volatile memory components 406 corresponds to a different portion of the data storage system 400. Thus, two portions of the data storage system correspond to the first data storage node 402, and one of the portions corresponds to the second data storage node 402. In the illustrated embodiment, the B portion of the data storage system 400 is in a read-only mode. Thus, the non-volatile memory component 406 corresponding to node B portion of the data storage system 400 may not be modified.

FIG. 4D illustrates a data storage system 400 that includes three data storage nodes 402 connected directly to one another in a fully connected topology. Each data storage node 402 includes a non-volatile memory component 406. The data storage system 400 implements a node-level read-only mode. In the illustrated embodiment, node B is in a read-only mode. Thus, the contents of non-volatile memory component 406 corresponding to node B may not be modified.

VI. Processing Write Requests

Figure 5A:
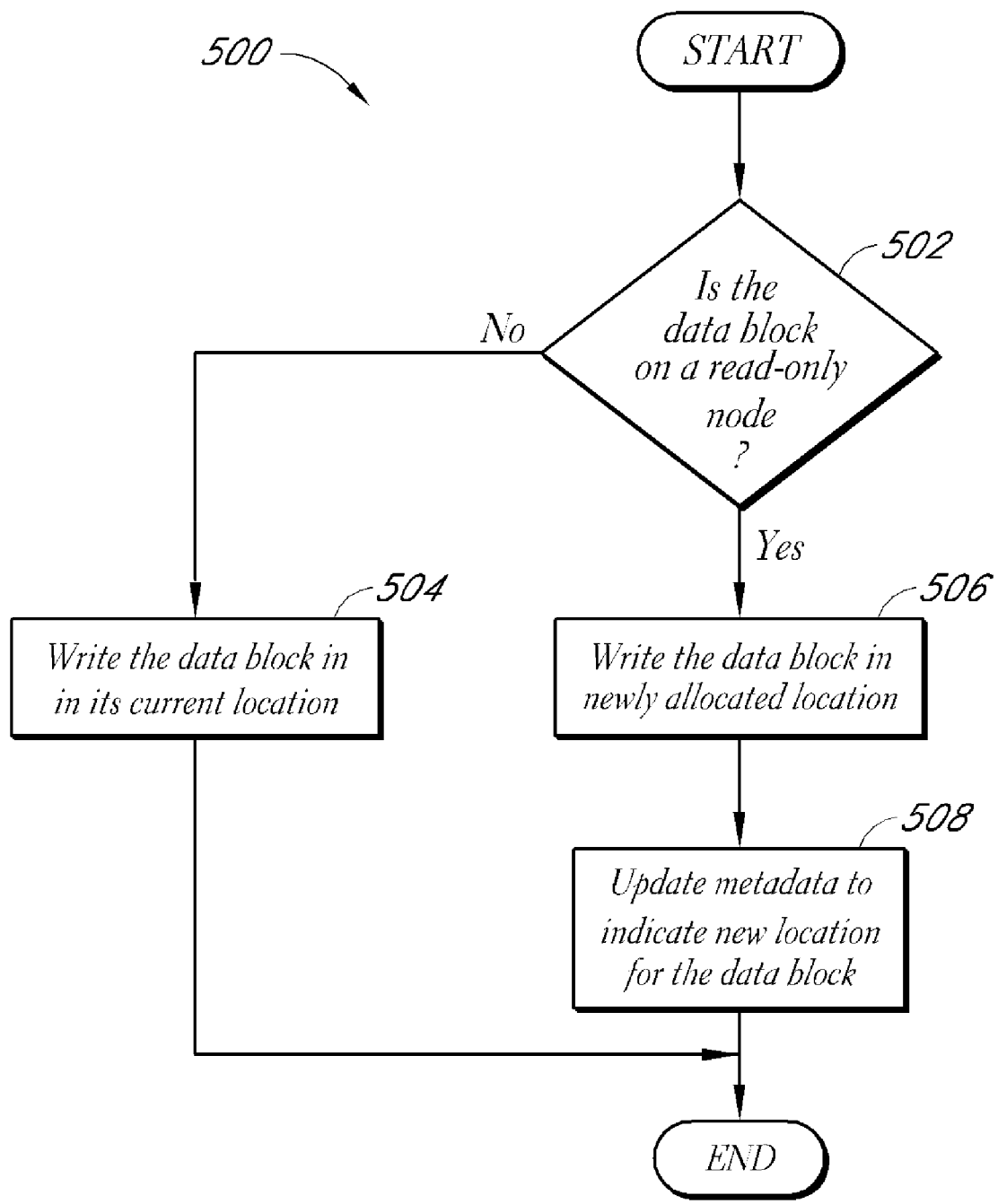
FIGS. 5A and 5B illustrate one embodiment of a process for writing data in a storage system when a portion of the storage system operates in a read-only mode.

FIG. 5A illustrates one embodiment of processing write requests in a data storage system when a portion of the data storage system is in a read-only mode. Embodiments of the nodes 102, storage modules, shown in FIG. 1 may be configured to store and/or implement embodiments of write process 500. Write process 500 may be included as part of an allocation module that determines where to write and/or rewrite data to a data storage system.

In state 502, write process 500 determines whether the data block to be written corresponds to a read-only mode. In other words, state 502 determines whether the write request would include a portion of the data storage system that is currently in a read-only mode. For example, a write transaction may involve three data blocks distributed across three nodes: $Node_A$, $Node_C$, and $Node_F$. If $Node_C$ is in a read-only mode, then the write process 500 determines that the data block corresponding to $Node_C$ is on a read-only node. Because the data blocks corresponding to a node in a read-only mode may not be written, the write process 500 must find an alternative way in which to write the data request. If the data block does not correspond to a read-only mode, then in state 504, the write process 500 writes the data block in its defined location. For example, the data blocks on $Node_A$ and $Node_F$ may be executed because the respective nodes are in a read-write mode. Thus, the data blocks corresponding to $Node_A$ and $Node_F$ are written to their respective locations on $Node_A$ and $Node_F$.

With respect to nodes in a read-only mode, the write process 500, in state 506, writes the data block in a newly allocated location. This newly allocated location may be in an available location on another node that is not in a read-only mode. For example, write process 500 could write the data block corresponding to $Node_C$ on one of the other nodes, such as on $Node_A$ or on $Node_F$, or also on $Node_D$ or on $Node_E$, and so forth, so long as these nodes are in a read-write mode. Because the data block previously corresponding to $Node_C$ has been written to a newly allocated location, the metadata corresponding to the data block may be updated to reflect the new location. In other words, prior to the write request, the data block corresponding to $Node_C$ was stored at a location on $Node_C$, and this location may have been recorded in various places in the data storage system to track the location of the data block. This metadata may be updated once the data block has been redirected to a new location.

Figure 5B:

As discussed above, with reference to FIG. 5A, when a data block corresponding to a read-only mode is reallocated to an available location on another node, the metadata corresponding to the respective data block is updated. FIG. 5B illustrates one example embodiment of updating metadata to reflect the new location for a data block. File X 550 includes three data blocks: Data Block 1, Data Block 2, and Data Block 3. These three data blocks are spread across the distributed storage system 552, which includes data storage nodes 554 connected via switch 556. Specifically, Data Block 1 is located on $Node_A$ 554 at block location 3. Data Block 2 is located on $Node_C$ 554 at block location 12. Data Block 3 is located on $Node_F$ 554 at block location 16. At some point after Data Block 2 has been written to $Node_C$ 554 at block location 12, $Node_C$ enters a read-only mode. Accordingly, Data Block 2 can no longer be modified. If a write request corresponding to File X 550 attempts to modify Data Block 2, data storage system 552 allocates a new location for Data Block 2 and writes the updated value to the newly allocated location. The metadata for File X 550 is then updated to indicate the newly allocated location of Data Block 2. Thus, Data Block 2 is now located on $Node_E$ 554 at block location 17, which is reflected in the metadata for File X 550. The location of Data Block 2 can be modified for File X 550, even though the old location of Data Block 2 was on a node in a read-only mode, because the metadata for File X 550 may be stored on different nodes than those on which the data blocks are stored. For a more detailed explanation of how the metadata and data of a file may be distributed among different nodes, see U.S. patent application Ser. No. 10/007,003, titled, "SYSTEMS AND METHODS FOR PROVIDING A DISTRIBUTED FILE SYSTEM UTILIZING METADATA TO TRACK INFORMATION ABOUT DATA STORED THROUGHOUT THE SYSTEM," filed Nov. 9, 2001, which claims priority to Application No. 60/309,803 filed Aug. 3, 2001, and which was incorporated above by reference in its entirety.

VII. Mounting Read-Only

As described above with respect to FIG. 3, a portion of a storage system may enter a read-only mode by waiting until relevant transactions have sufficiently resolved, marking the portion unwritable, and backing up the portion. In some circumstances, it may be disadvantageous and/or not possible to wait for transactions to resolve as part of entering a read-only mode. For example, in some circumstances, it may be advantageous to enter a read-only mode when a file system mounts without waiting for the relevant transactions to resolve further. Thus, in some embodiments, a portion-specific read-only mode may be entered by marking the portion unwritable and backing up the portion, without first waiting for the relevant transactions to resolve. FIGS. 6A and 6B illustrate one embodiment of a problem that arises when a portion enters a read-only mode with unresolved transactions, such as when the file system is mounted. In some embodiments, a node in a read-only mode can defer operations associated with resolving the transactions until after leaving the read-only mode. FIGS. 6C and 6D illustrate embodiments of deferring transactions until after leaving a read-only mode.

FIG. 6A illustrates three data journals corresponding to three portions of a data storage system (three storage modules): $Journal_A$ corresponding to $Node_A$, $Journal_B$ corresponding to $Node_B$, and $Journal_C$ corresponding to $Node_C$. There are two global transactions recorded in the respective journals. Transaction blocks 604 indicate the transaction state for each respective transaction. Both transaction $T_1$ and transaction $T_2$ are in the "prepared" state. All of the data blocks 606 remain in the "unflushed" state because the transactions have not yet committed. FIG. 6A illustrates an event, such as a power failure, in which $Node_B$ becomes temporarily unavailable.

FIG. 6B illustrates that $Node_B$ returns to the cluster and mounts in a read-only mode. By this time, $Node_A$ and $Node_C$ of the data storage system have further resolved transaction $T_1$ and transaction $T_2$. Transaction $T_1$ has been aborted and transaction $T_2$ has committed. The respective transaction block 604 corresponding to transaction $T_1$ has been unlinked from the respective journal block 602 and the respective data blocks 606 corresponding to transaction $T_2$ have been flushed to permanent storage. $Node_B$ can communicate with $Node_A$ and $Node_C$ to discover that Transactions $T_1$ and $T_2$ have aborted and committed, respectively. Because $Node_B$ is in a read-only mode, however, $Journal_B$ cannot be modified. Thus, the modifications to $Journal_B$ are deferred until $Node_B$ exits a read-only mode. Furthermore, $Node_B$ cannot communicate to $Node_A$ and $Node_C$ its acknowledgment that transaction $T_1$ and transaction $T_2$ have aborted and committed, respectively. If $Node_B$ communicates this information to $Node_A$ and $Node_C$, then $Journal_A$ and $Journal_C$ would remove the transaction state information related to transactions $T_1$ and $T_2$. Then, if $Node_B$ were to lose the information that Transactions $T_1$ and $T_2$ had aborted and committed, respectively, $Node_B$ would not be able to regain this information because $Journal_A$ and $Journal_C$ no longer keep a record that could be communicated to $Node_B$. In some embodiments, journal writes and messages to other portions of the data storage system are deferred until the relevant portion of the storage system exits the read-only mode.

FIG. 6C illustrates one embodiment of memory data structures that may be used to defer certain transaction processes until an affected portion exits a read-only mode. $Memory_B$ 650 corresponds to $Node_B$ of the data storage system. $Memory_B$ 650 includes a deferred write queue (DWQ) 656 and a list of transaction states, such as the transaction state for transaction $T_2$ 654. The DWQ 656 includes deferred write commands 658, including a deferred write command 658 for unlinking the transaction block 604 corresponding to transaction $T_1$. The DWQ 656 may also include other deferred write commands 658 (not illustrated). The transaction state block 654 is marked commit-deferred. This information allows the journal system to commit transaction $T_2$ when $Node_B$ exits the read-only mode.

FIG. 6D illustrates the contents of $Memory_B$ 650 and $Journal_B$ 600 after processing the deferred transactions related to transactions $T_1$ and $T_2$. Once $Node_B$ exits the read-only mode and enters the read-write mode, transactions $T_1$ and $T_2$ may be aborted and committed, respectively. The DWQ 656 is emptied by executing each of the deferred write commands 658. Thus, transaction $T_1$'s transaction block 604 is unlinked from the journal block 602 corresponding to $Journal_B$ 600. Furthermore, the transaction blocks 654 are traversed, and any transactions marked "commit-deferred" are committed. Thus, transaction block 604 corresponding to transaction $T_2$ is marked "committed" and the respective data block 606 is subsequently flushed to disk. After the respective data block 606 is flushed and after $Node_B$ has received commit confirmation from the other participants of transaction $T_2$, $T_2$'s transaction block 604 can be unlinked from the journal block 602 corresponding to $Journal_B$ 600. In the illustrated embodiments the DWQ 656 is used for deferred operations associated with an aborted transaction and the list of transaction blocks 654 is used for deferred operations associated with a committed transaction. In other embodiments, these data structures may be used in other ways to defer certain operations. Additionally and/or alternatively, other data structures may be used in order to defer certain operations.

Figure 7A:
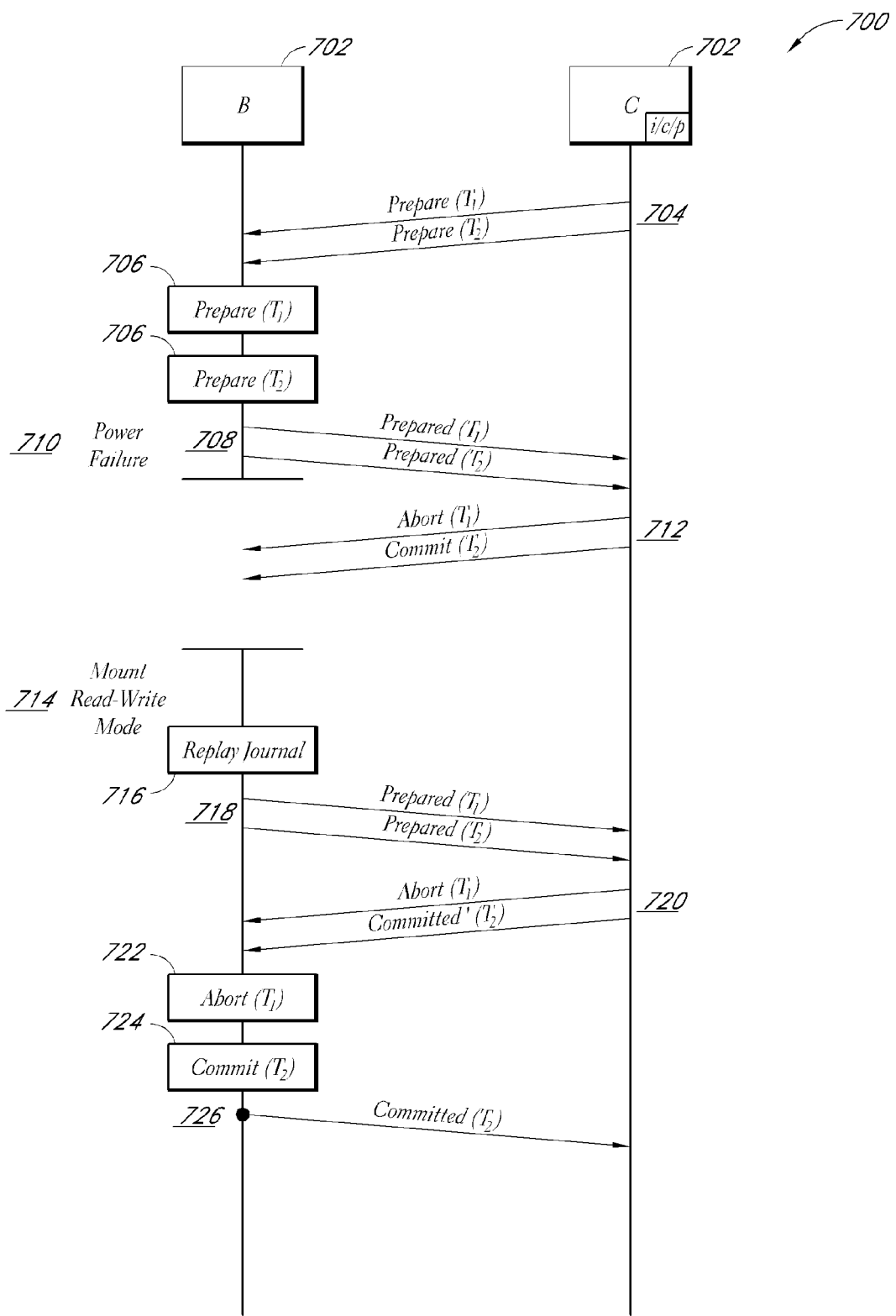
FIG. 7A illustrates one embodiment of a protocol for mounting a file system in a read-write mode following a temporary power failure.
Figure 7B:
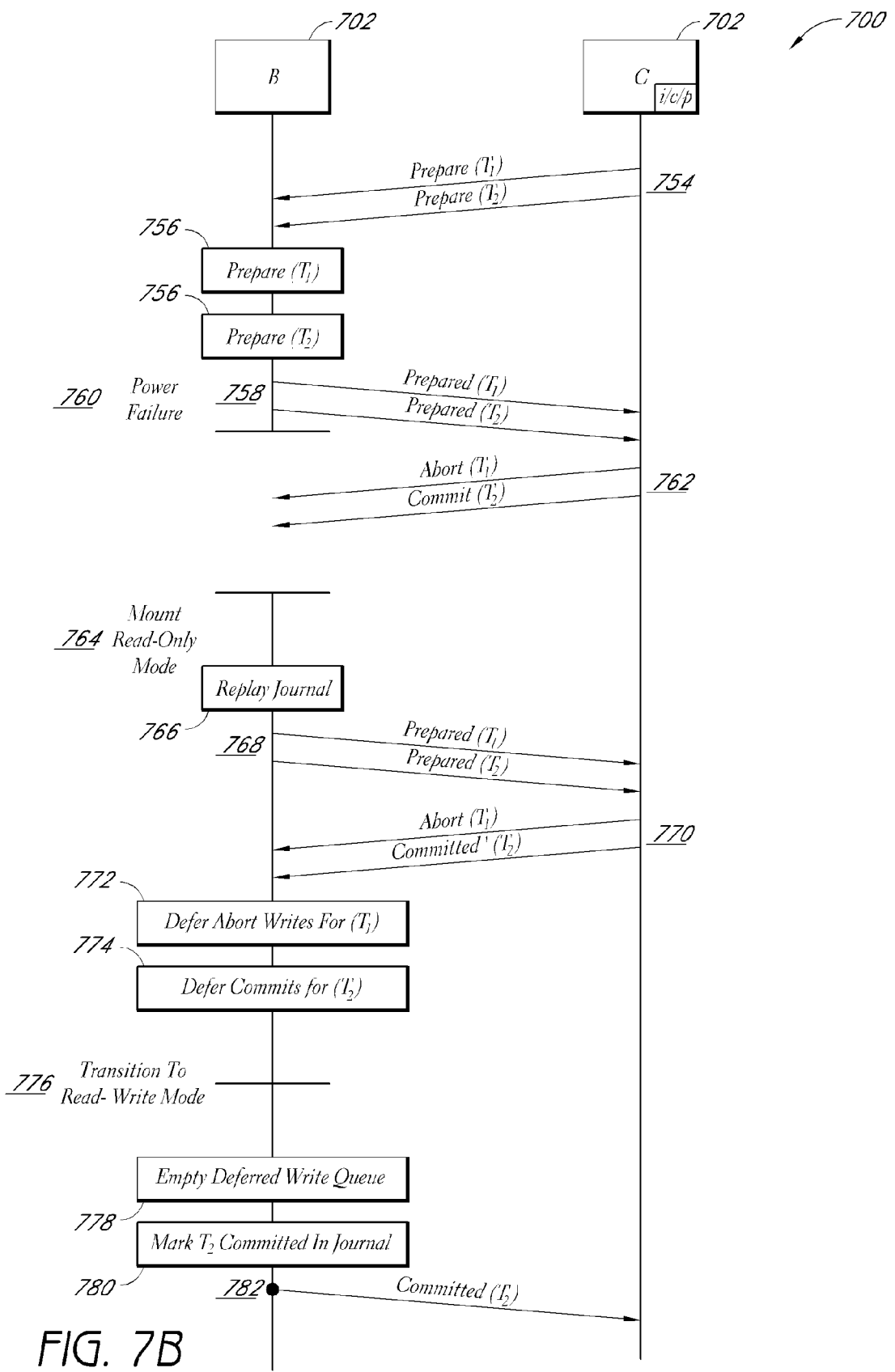
FIG. 7B illustrates one embodiment of a protocol for mounting a file system in a read-only mode following a temporary power failure.

FIGS. 7A and 7B illustrate embodiments of protocols for mounting a portion of a data storage system after a temporary power failure. FIG. 7A illustrates one embodiment of a protocol for mounting in a read-write mode. Embodiments of protocols for managing interactions between nodes that process global transactions are disclosed in: U.S. patent application Ser. No. 11/262,306, titled, "NON-BLOCKING COMMIT PROTOCOL SYSTEMS AND METHODS," filed Oct. 28, 2005, which was incorporated above by reference in its entirety. FIG. 7B illustrates one embodiment of a protocol for mounting in a read-only mode. In some embodiments, the protocols in the above-mentioned application may be adapted to accommodate protocols for mounting in a read-only mode.

In FIGS. 7A and 7B, a storage system 700 is illustrated. Two portions of the data storage system 700 are illustrated communicating with one another. These portions are referred to as nodes 702, which are storage modules with processors and at least one storage device. $Node_C$ 702 has a special role as the initiator, coordinator, and participant of two transactions being processed by data storage system 700. $Node_B$ 702 is a participant of the two transactions. The roles of the initiator, coordinator, and participants are described in greater detail in the above-mentioned application incorporated herein it its entirety. While processing the two transactions, $Node_B$ experiences a power failure that temporarily interrupts its ability to process the transactions. FIGS. 7A and 7B illustrate embodiments of mounting a file system after a temporary power failure in read-write and read-only modes, respectively. Although recovering from a temporary power failure is one circumstance in which a portion of a storage system might remount a file system, there are other possible circumstances. For example, a storage node might be disconnected from a cluster of nodes and might then be unmounted from the file system. One skilled in the art will appreciate that there are other suitable scenarios in which a storage node may remount a file system following certain circumstances.

FIG. 7A illustrates one embodiment of a protocol to mount $Node_B$ 702 in a read-write mode after experiencing a temporary power failure. In state 704, $Node_C$ 702 transmits "Prepare" messages to $Node_B$ 702 for transactions $T_1$ and $T_2$. In state 706, $Node_B$ 702 prepares transactions $T_1$ and $T_2$. This preparation may include receiving data blocks from $Node_C$ 702 corresponding to transactions $T_1$ and $T_2$ that are to be written in the permanent storage of $Node_B$ 702. In state 708, $Node_B$ 702 communicates to $Node_C$ that the transactions $T_1$ and $T_2$ have been prepared. In state 710, $Node_B$ 702 experiences a temporary power failure. When $Node_C$ 702 communicates, in state 712, to $Node_B$ 702, that transaction $T_1$ should abort and that transaction $T_2$ should commit, $Node_B$ 702 does not receive the messages. In state 714, the $Node_B$ 702 mounts in a read-write mode.

In state 716, $Node_B$ 702 replays the contents of its journal. In other words, $Node_B$ 702 traverses the transactional information recorded in the journal and begins to process the respective transactions. While in the process of replaying the journal, $Node_B$ 702 recognizes that transactions $T_1$ and $T_2$ have been prepared. $Node_B$ 702 then communicates to $Node_C$ 702 that the transactions have been prepared. In state 718, these "Prepared" messages are communicated to $Node_C$ 702. In state 720, $Node_C$ 702 instructs $Node_B$ 702 to abort transaction $T_1$ and to commit transaction $T_2$. In some embodiments, the message communicated may request that the recipient return a communication once it has finished processing the respective command. For example, $Node_C$ 702 sends a Committed' message to $Node_B$ 702, which informs $Node_B$ 702 to return a "Committed" message once transaction $T_2$ has been committed. In state 722, $Node_B$ 702 aborts transaction $T_1$. In state 724, $Node_B$ 702 commits transaction $T_2$. In state 726, $Node_B$ 702 communicates to $Node_C$ 702, that transaction $T_2$ has been committed.

FIG. 7B illustrates one embodiment of a protocol for mounting in a read-only mode after a temporary power failure. States 754, 756, 758, 760, and 762 correspond to states 704, 706, 708, 710, and 712, described above with respect to FIG. 7A. In state 764, $Node_B$ 702 mounts in read-only mode. States 766, 768, and 770 correspond to states 716, 718, and 720 described above with respect to FIG. 7A. When $Node_B$ 702 receives the "Abort" message for transaction $T_1$ and the Committed' message for transaction $T_2$, $Node_B$ 702 cannot process these commands as it would in read-write mode because the contents of the journal may not be modified during the read-only mode. In state 772, $Node_B$ 702 defers write commands associated with the abort message for transaction $T_1$. Deferred writes were described in greater detail above with reference to FIGS. 6C and 6D. In state 724, $Node_B$ 702 defers the operations associated with the Committed' message for transactions $T_2$. The operations for deferring a "Commit" message are described in greater detail above with reference to FIGS. 6C and 6D.

In state 776, $Node_B$ 702 transitions to a read-write mode. In state 778, $Node_B$ 702 empties the DWQ. Processing the operations associated with emptying the DWQ are described in greater detail above with reference to FIGS. 6C and 6D. In state 780, $Node_B$ 702 marks transaction $T_2$ as committed in the journal. Marking a transaction as committed is described in greater detail above with reference to FIGS. 6C and 6D. In state 782, $Node_B$ 702 sends a "Committed" message to $Node_C$ 702.

Figure 8:
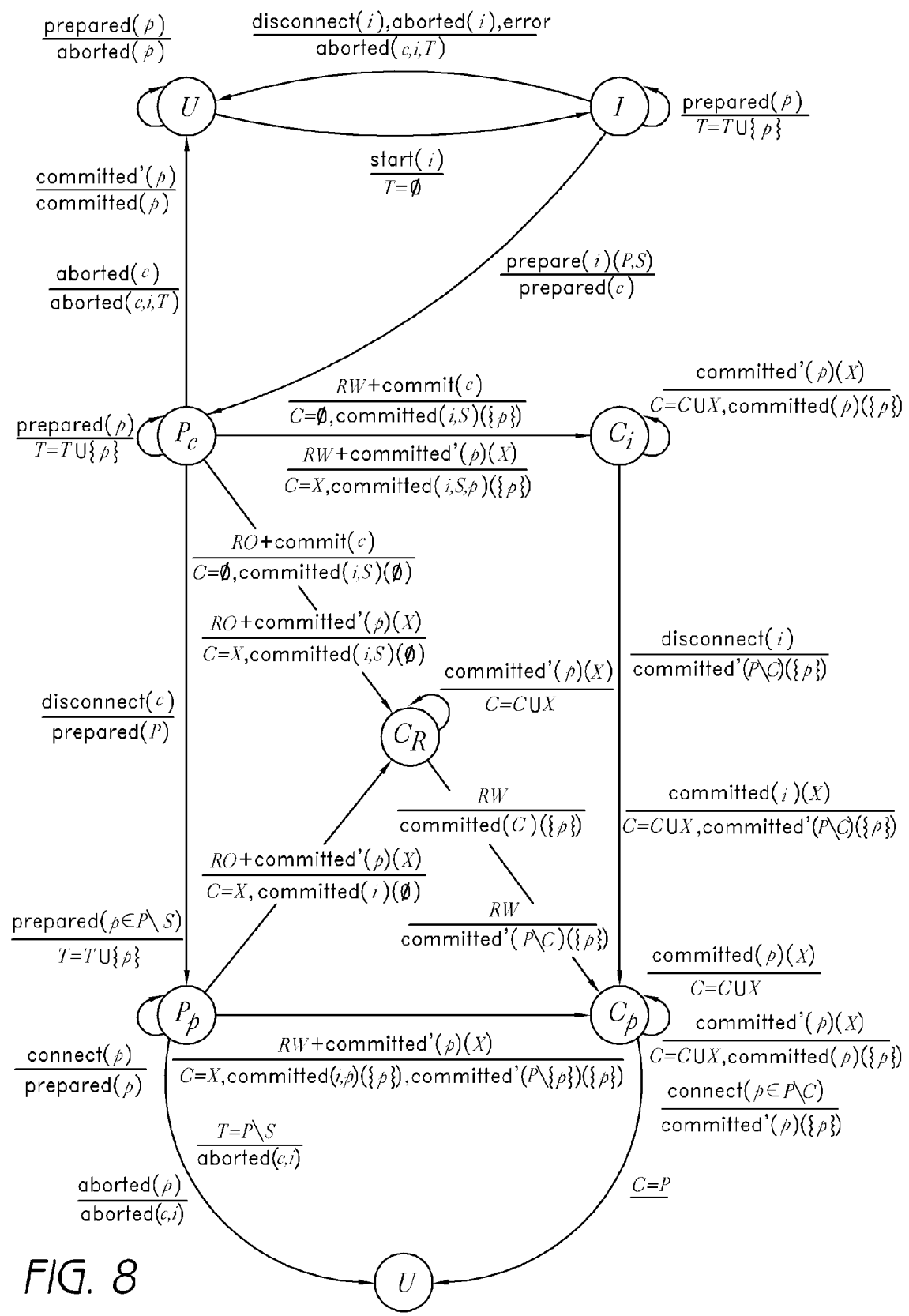
FIG. 8 illustrates one embodiment of a state diagram for a protocol implementing a read-only mode for a portion of a storage system.

FIG. 8 illustrates one embodiment of a state diagram for a protocol that includes a read-only mode for a portion of a storage system. The states and transitions correspond to embodiments of a read-only mode described herein. A related state diagram was disclosed in: U.S. patent application Ser. No. 11/262,306, titled, "NON-BLOCKING COMMIT PROTOCOL SYSTEMS AND METHODS," filed Oct. 28, 2005, which was incorporated above by reference in its entirety. The state diagram in FIG. 8 introduces a new state, $C_R$, which corresponds to a commit deferred state in read-only mode. The following illustrates one embodiment of exemplary pseudocode for a protocol that includes a read-only mode for a portion of a storage system. The pseudocode corresponds to embodiments of a read-only mode described herein.

```
function abort(T):
    log abort
    send aborted to T ∪ {i, c}
    set state to U
function commit_r(C, P, S):
    send committed(∅) to S ∪ {i}
    set state to (C_R, C, P)
function commit_i(C, P, S):
    log commit
    send committed({p}) to S ∪ {i}
    set state to (C_i, C, P)
function commit_p(C, P):
    send committed'({p}) to P \ C
    set state to (C_p, C, P)
in state U:
    on committed'(X) from p:      send committed({p}) to p
    on prepared from p:            send aborted to p
    on start from i:               log start
                                   set state to (I, ∅)

on commit from c:
    on prepare from i:
    on aborted from c; i; p:
in state (I, T):
    on disconnect from i:          abort(T)
    on local failure:              abort(T)
    on aborted from i:             abort(T)
    on prepared from p:            set state to (I, T ∪ {p})
    on prepare(P, S) from i:       log prepare(P, S)
                                   send prepared to c
                                   set state to (P_c, T, P, S)
in state (P_c, T, P, S):
    on disconnect from c:          send prepared to P
                                   set state to (P_p, T, P, S)

on aborted from c:             abort(T)
    on commit from c:
        if RW:                     commit_i(∅, P, S)
        else:                      commit_r(∅, P, S)
    on committed'(X) from p∈ P:
        if RW:                     commit_i(X, P, S)
                                   send committed({p}) to p
        else:                      commit_r(X, P, S)
    on prepared from p∈ P:         set state to (P_c, T ∪ {p}, P, S)
in state (P_p, T, P, S):
    if T = P \ S:                  abort(∅)
    on connect to p∈ P:            send prepared to p
    on aborted from p∈ P:          abort(∅)
    on commit from c:
    on committed' (X) from p∈ P:
        if RW:                     log commit
                                   commit_p(X, P)
                                   send committed({p}) to {i, p}
        else:                      commit_r(X, P, ∅)
    on prepared from p∈ P \ S:     set state to (P_p, T ∪ {p}, P, S)
in state (C_R, C, P):
    on RW:                         log commit
                                   send committed({p}) to C
                                   commit_p(C, P)
    on committed'(X) from p∈ P:    set state to (C_R, C ∪ X, P)
in state (C_i, C, P):
    on committed(X) from i:        commit_p(C ∪ X, P)
    on disconnect from i:          commit_p(C, P)
    on commit from c:
    on committed'(X) from p∈ P:    set state to (C_i, C ∪ X, P)
                                   send committed({p}) to p
    on prepared from p∈ P:
in state (C_p, C, P):
    if C = P:                      log done
                                   set state to U
    on connect to p∈ P \ C:        send committed'({p}) top
    on commit from c:
    on committed(X) from p∈ P:     set state to (C_p, C ∪ X, P)
    on committed'(X) from p∈ P:    set state to (C_p, C ∪ X, P)
                                   send committed({p}) to p
    on prepared from p∈ P:
```

VIII. Example Processes

Figure 9:
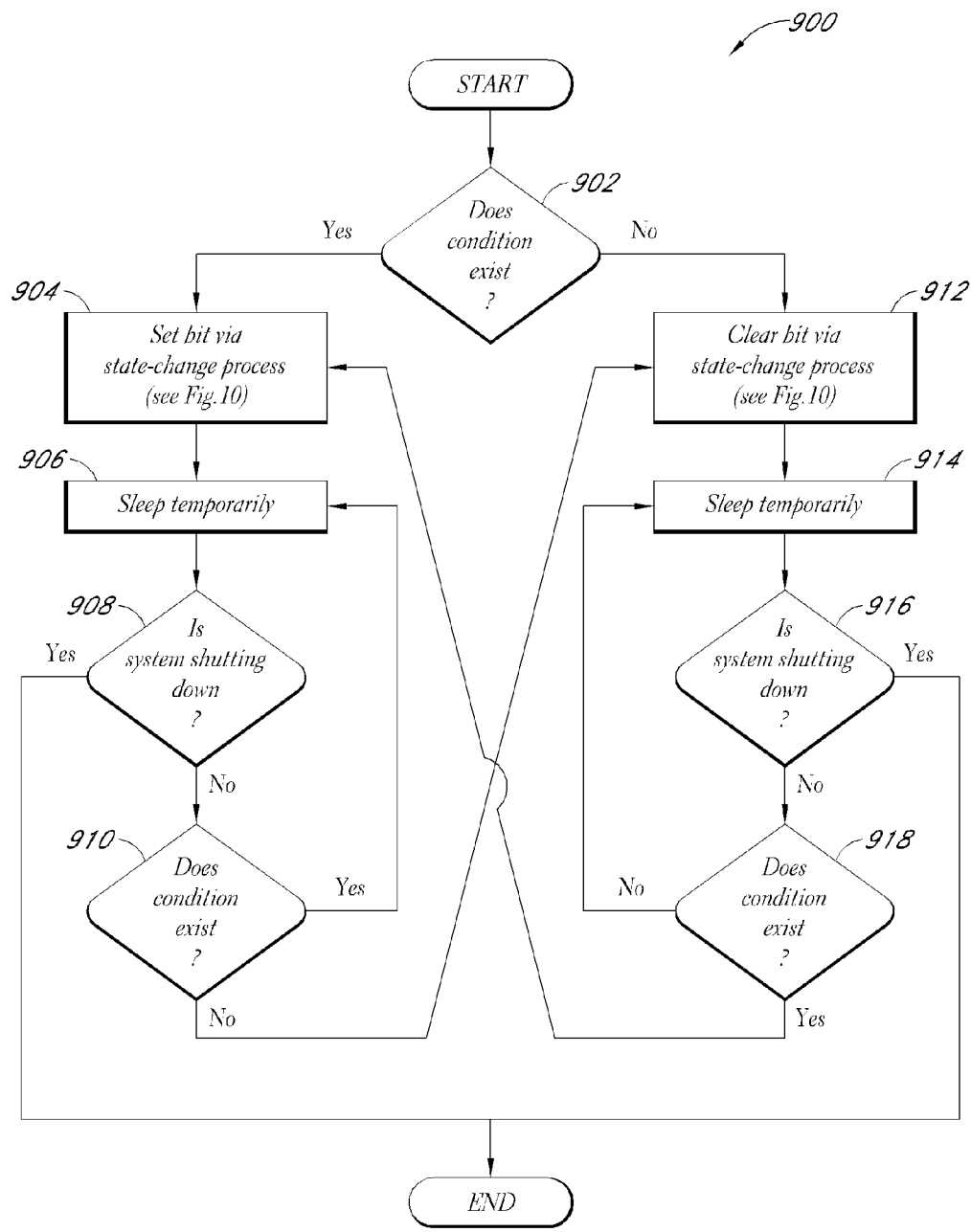
FIG. 9 illustrates one embodiment of a monitor process for detecting conditions relevant to a read-only mode for a portion of a storage system.

FIG. 9 illustrates one embodiment of a process to monitor conditions that may negatively affect a portion of a data storage system. Embodiments of the nodes 102 shown in FIG. 1 may be configured to store and/or implement embodiments of monitor process 900. In state 902, monitor process 900 determines whether a condition exists that negatively affects the durability of a portion of the storage system. For example, each condition that is tested for may correspond to one or more daemon processes that continuously monitor for the condition. It will be appreciated by one skilled in the art that there are many suitable ways to detect for conditions that may negatively affect the durability of a portion of the storage system. For example, whether the chassis is open may be determined by a combination of hardware sensors and/or software monitors that detect for the presence of the open chassis condition.

If a condition exists, the monitor process 900 proceeds to state 904 which sets the bit corresponding to the detected condition via a state-change process, described below with reference to FIG. 10. After the state has been changed, in state 906, the monitor process 900 sleeps temporarily for a certain amount of time. The amount of time may be defined or may be randomly determined. In state 908, the monitor process 900 determines whether the system is shutting down. If the system is shutting down, then the monitor process 900 terminates. If the system is not shutting down, the monitor process 900 determines whether the already detected condition still exists. If the already detected condition still exists, then the monitor process 900 returns to state 906 to await another period of testing for the condition. If the already detected condition does not exist, then the monitor process 900 proceeds to state 912 in order to clean the bit corresponding to the no longer detected condition via state-change process described in greater detail below with reference to FIG. 10.

If in state 902 the monitor process 900 detected that the condition did not exist, then monitor process 900 proceeds to state 912 to clear the bit corresponding to the tested for condition via a state-change process described in greater detail below with reference to FIG. 10. In state 914, the monitor process 900 sleeps temporarily. The amount of sleep time may be a defined value, determined at random, or dynamically changed. In state 916, the monitor process 900 determines whether the system is shutting down. If the system is shutting down, then the monitor process 900 terminates. If the system is not shutting down, then, in state 918, the monitor process 900 determines whether the previously tested for condition exists. If the previously tested for condition still does not exist, then the monitor process 900 returns to state 914 until it tests again. If the previously tested for condition now exists, then the monitor process 900 proceeds to state 904 in order to set the bit corresponding to the now detected condition via a state-change process described in greater detail below with reference to FIG. 10.

Figure 10:
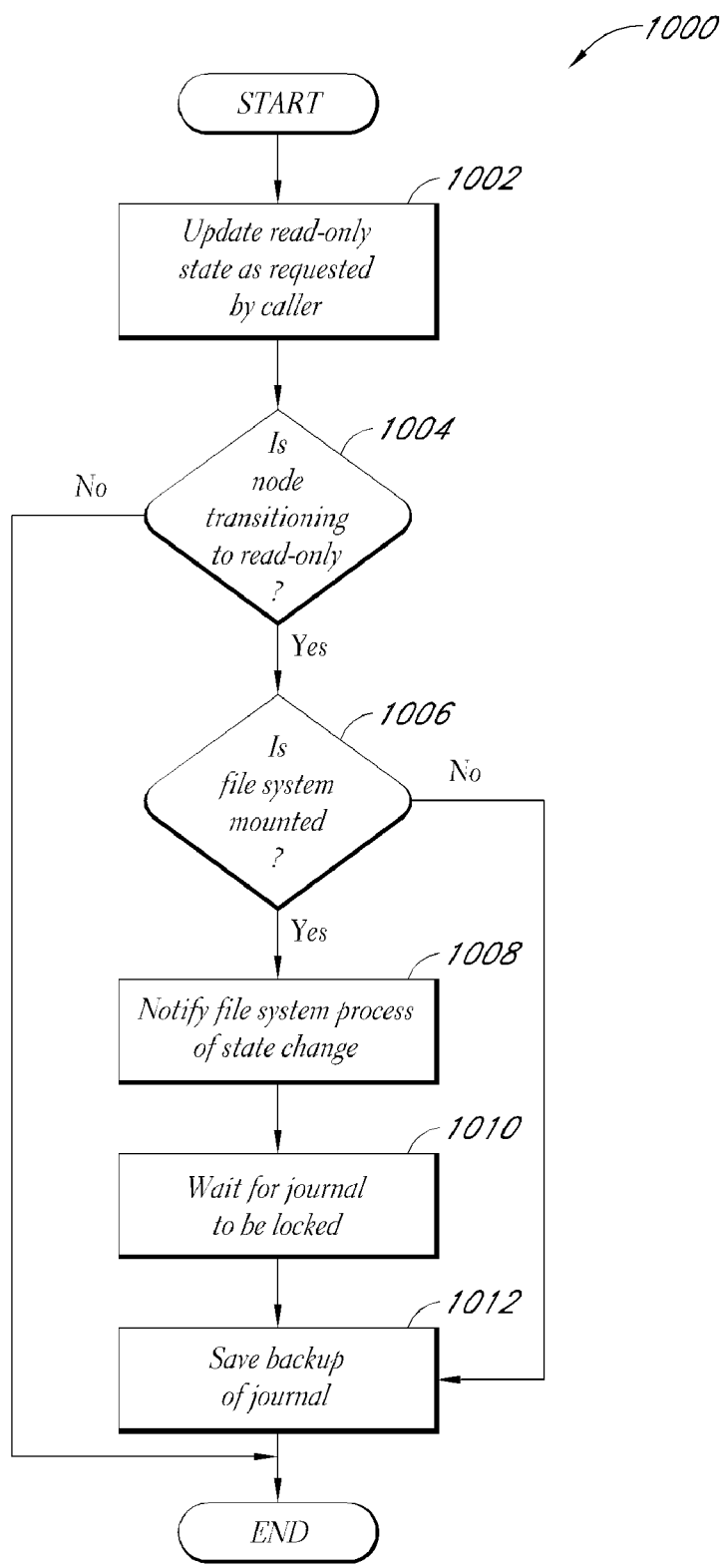
FIG. 10 illustrates one embodiment of a state change process for responding to a condition relevant to a read-only mode for a portion of a storage system.

FIG. 10 illustrates one embodiment of a process to change the state of a portion of a data storage system. Embodiments of the nodes 102 shown in FIG. 1 may be configured to store and/or implement embodiments of state-change process 1000. In state 1002, the state-change process 1000 updates the read-only state as requested by the calling process such as monitor process 900. In other words, if monitor process 900 requested that a bit corresponding to a particular condition be set, then state-change process 1000 sets the respective bit in order to update the read-only status of the calling process. Alternatively, if the monitor process 900 requested that a bit corresponding to a read-only mode condition be cleared, then the state-change process 1000 clears the bit in order to update the read-only state as requested by the calling process.

In some embodiments, there is more than one condition that may trigger the read-only state. Thus, even when a condition is detected, the relevant portion of the storage system may not transition to a read-only mode because the relevant portion is already in the read-only mode due to another condition. Furthermore, in some embodiments, a "Disallow" condition may prevent entry into the read-only mode. Therefore, in some embodiments, when a condition is detected, the data storage system may not enter the read-only mode because it is presently disallowed. It will be appreciated by one skilled in the art that there are various suitable ways to detect conditions and then to transition into a read-only mode.

In state 1004, the state-change process 1000 determines whether the node has transitioned into a read-only mode. If the node has not transitioned into a read-only mode, then the state-change process 1000 terminates. If the node has transitioned into a read-only mode, then the state-change process 1000 proceeds to state 1006. In state 1006 the state-change process 1000 determines whether the file system is mounted. If the file system is not mounted, then the state-change process 1000 proceeds to state 1012. If the file system is mounted, then the state-change process 1000 proceeds to state 1008. In state 1008, the state-change process 1000 notifies the file system process of a state-change. The file system process is described in greater detail below with reference to FIG. 11. In state 1010, the state-change process 1000 waits for the journal to be locked. In some embodiments, waiting for the journal to be locked includes waiting for the relevant transactions in the journal to sufficiently resolve. In some embodiments, waiting for the relevant transactions in the journal to sufficiently resolve comprises draining the journal of prepared transactions. Once the journal has been locked, in state 1012, a backup of the journal is saved and the state-change process 1000 terminates. In some embodiments, saving a backup of the journal also includes marking the journal as unwritable.

Figure 11:
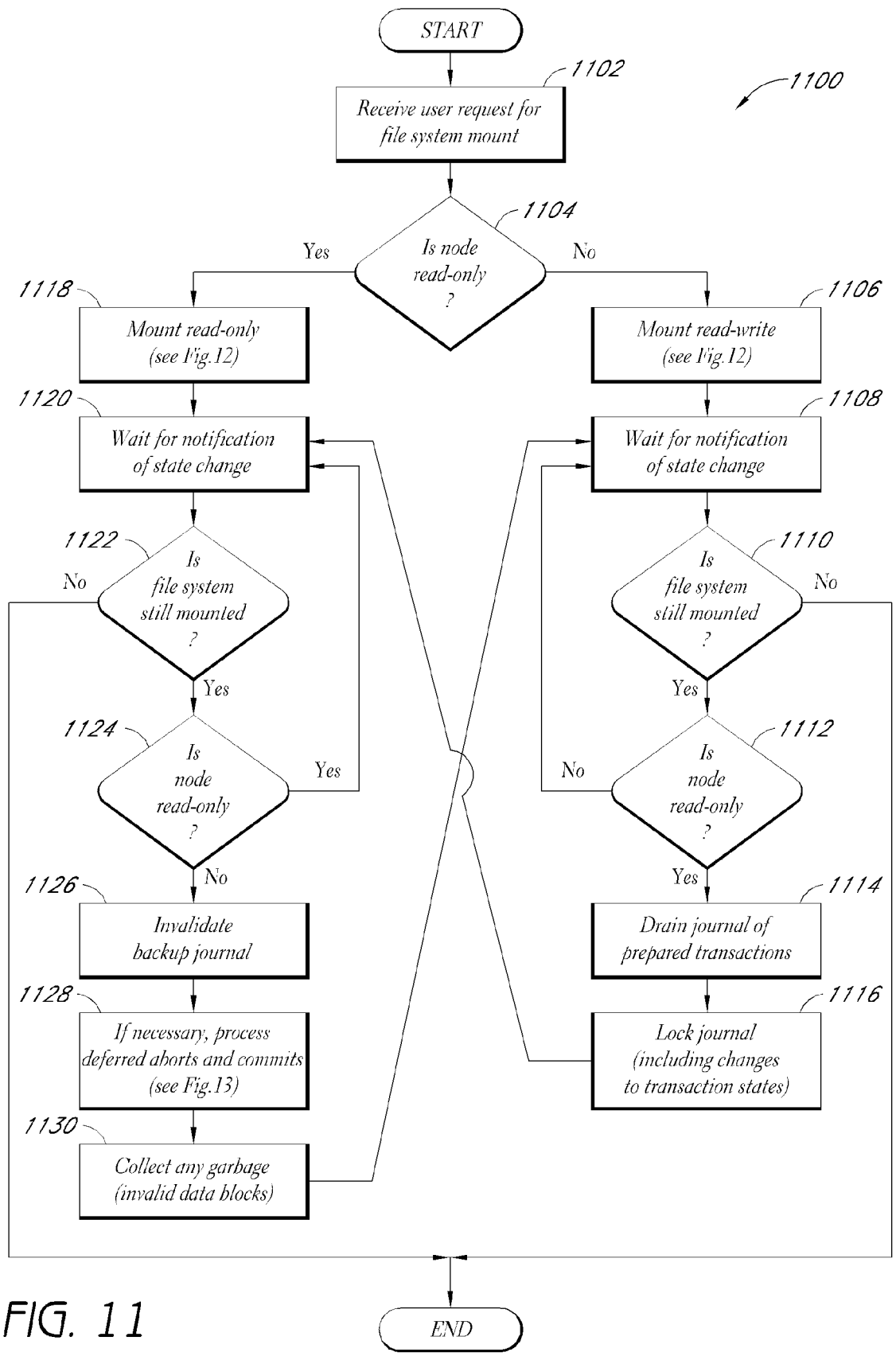
FIG. 11 illustrates one embodiment of a file system process that implements a read-only mode for a portion of a storage system.

FIG. 11 illustrates one embodiment of a process to manage a file system that implements a read-only mode for a portion of the storage system. Embodiments of the nodes 102, storage modules, shown in FIG. 1 may be configured to store and/or implement embodiments of file system process 1100. In state 1102, file system process 1100 receives a request from a user to mount the file system on a portion of the data storage system. In some embodiments, the respective portions of the data storage system are nodes, and, in the description below, portions of the data storage system will be referred to as nodes.

In state 1104, file system process 1100 determines whether the relevant node is in a read-only mode. If the node is not in a read-only mode, then the file system process 1100, in state 1106, mounts the file system to the relevant node in read-write mode. Mounting the file system in read-write mode is described below in greater detail with reference to FIG. 12. In state 1108, the file system process 1000 waits for notification of a state-change. When the notification of a state-change is received, then the file system process 1100, in state 1110, determines whether the file system is still mounted. If the file system is not still mounted, then the file system process 1100 terminates. If the file system is still mounted, then the file system process 1100, in state 1112, terminates. If the node has not entered a read-only mode, then the file system process 1100 returns to state 1108 and waits for notification of a state change. As described in greater detail above with respect to FIG. 3 and FIG. 10, some state-changes will not cause a node to enter a read-only mode, even if the node is in a read-write mode. If the node is in a read-only mode, then file system process 1100, in state 1114, drains the journal of prepared transactions. Then, in state 1116, file system process 1100 locks the journal, preventing any changes to transaction states as well. The file system process 1100 then proceeds to state 1120.

If after receiving a request from a user to mount the file system, the file system process 1100 determines that the relevant node is in a read-only mode, then file system process 1100, in state 1118, mounts the file system as a read-only node. Mounting the file system for a read-only node is described in greater detail below with reference to FIG. 12. In state 1120, the file system process 1100 waits for notification of a state change. In state 1122, file system 1100 determines whether the file system is still mounted. If the file system is not still mounted, then the file system process 1100 terminates. If the file system is still mounted, then file system 1100, in state 1124, determines whether the node is still in a read-only mode. If the node is still in a read-only mode, then the file system process 1100 returns to state 1120 and wait for notification of a state change. As described in greater detail above with reference to FIG. 3 and FIG. 10, some state changes may not cause a node to exit a read-only mode. If the node is no longer in a read-only mode, then file system process 1100, in state 1126, invalidates the backup of the Journal for the node. Then, in state 1128, the file system process 1100 processes any deferred operations related to aborted and committed transactions. In some cases, it is possible that there are no deferred operations. Processing deferred operations related to aborted and committed transactions is described in greater detail below with reference to FIG. 13. In state 1130, file system process 1100 collects any garbage. In other words, file system process 1100 collects any data blocks that were invalidated during the read-only mode. For example, as described in greater detail above with reference to FIGS. 5A and 5B, data blocks that correspond to read-only nodes are re-written to other nodes. The previous data block values stored on the nodes in read-only mode are then invalidated. Once the relevant node has exited the read-only mode, the invalid data blocks may then be collected.

Figure 12:
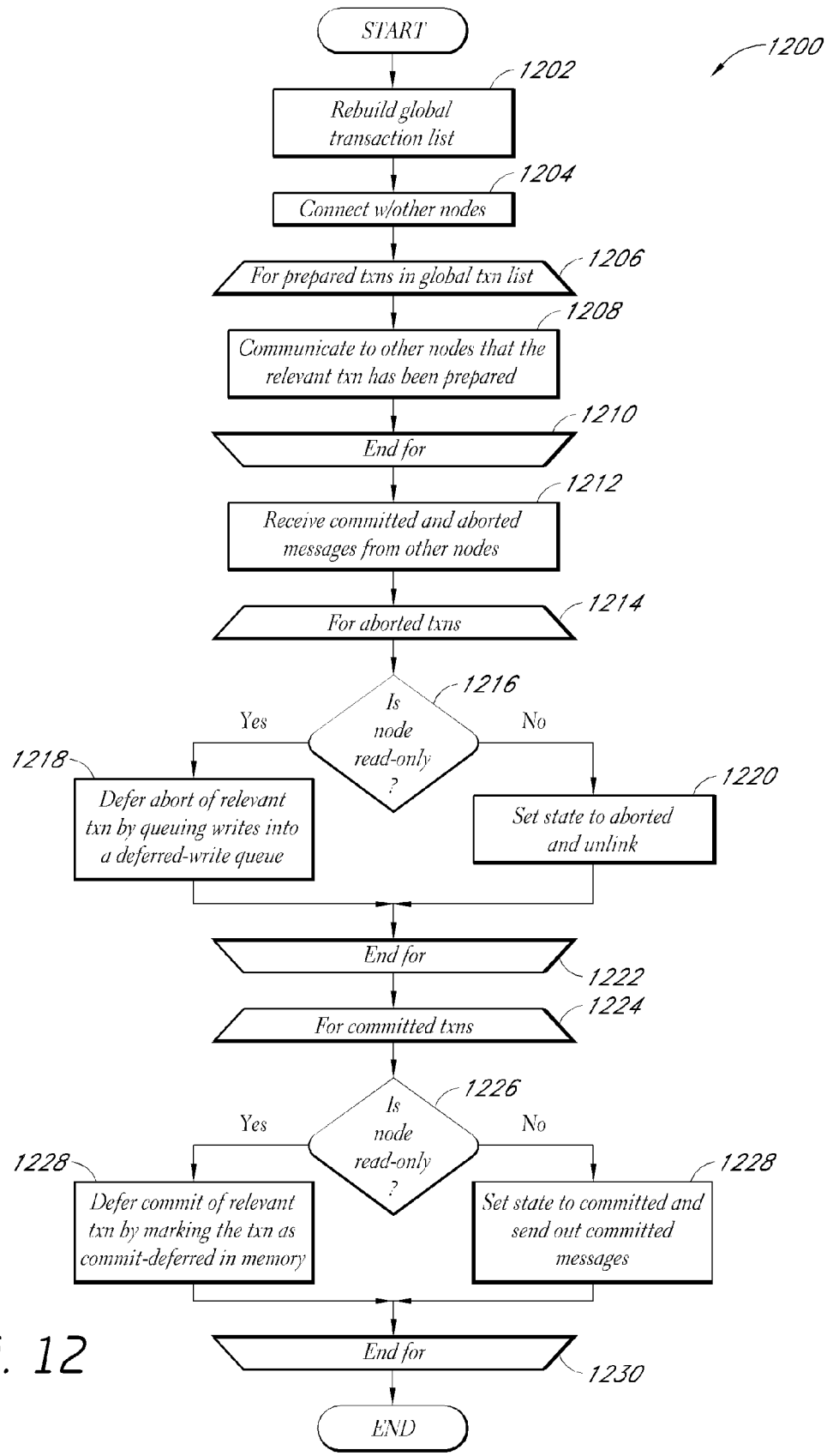
FIG. 12 illustrates one embodiment of a process for mounting a file system to a portion of the storage system.

FIG. 12 illustrates one embodiment of a mount process 1200 for mounting a file system to a portion of a data storage system in either a read-only or read-write mode. Embodiments of the nodes 102 shown in FIG. 1 may be configured to store and/or implement embodiments of mount process 1200. With respect to a description of mount process 1200, portions of a storage system are referred to as nodes. Data journals may store information related to global transactions processed by the data storage system across different nodes. This information may include a global transaction list that records, for example, information related to the respective transaction state of the global transactions, as well as copies of data values associated with the respective global transactions and also other information.

In state 1202, the mount process 1200 rebuilds the global transaction list from the journal data. In state 1204, mount process 1200 establishes a connection with other nodes. The operations between states 1206 and 1210 are executed for the prepared transactions in the global transactions list. In state 1208, mount process 1200 communicates to other nodes that the relevant transaction has been prepared. In state 1212, the mount process 1200 receives Committed' and "Aborted" messages from other nodes. The operations between states 1214 and state 1222 are executed for the aborted transactions. In state 1216, mount process 1200 determines whether the node is in a read-only mode. If the node is in a read-only mode, the mount process 1200 defers the abort of the relevant transaction by queuing writes into a DWQ. The DWQ is described in greater detail above with reference to FIGS. 6C and 6D. If the node is not in a read-only mode, then the relevant transaction is aborted and the aborted transaction is unlinked in the journal, in state 1222. The operations between state 1224 and 1230 are executed for the committed transactions. In state 1226, the mount process 1200 determines whether the node is in a read-only mode. If the node is in a read-only mode, the mount process 1200 defers the commit of the relevant transaction by marking the transaction as commit-deferred in memory. Marking a transaction as commit-deferred in memory is described in greater detail above with reference to FIGS. 6C and 6D. If the node is not in a read-only mode, then the mount process 1200 sets the transaction state to committed and sends out "Committed" messages to the other nodes participating in the transaction.

Figure 13:
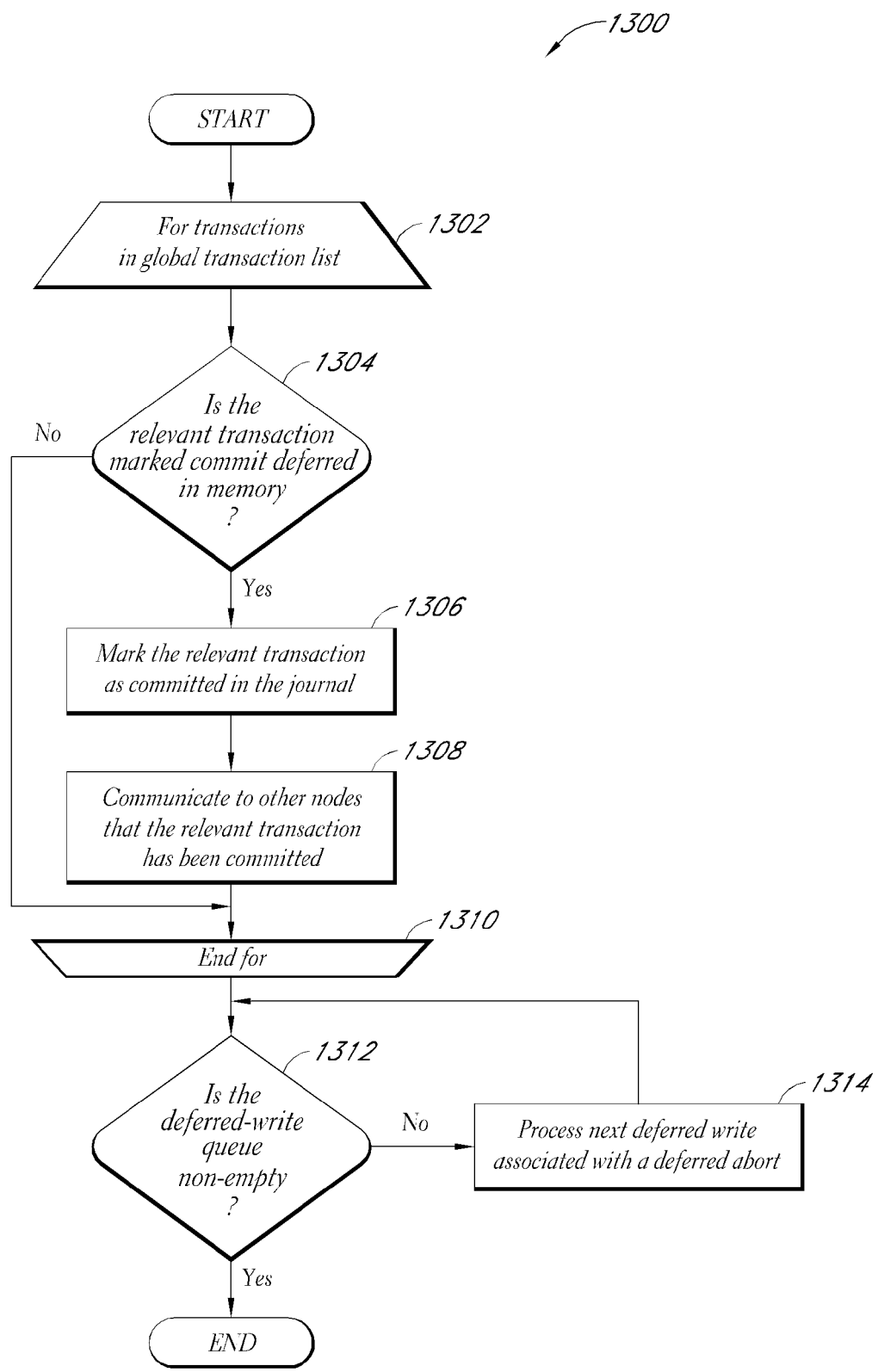
FIG. 13 illustrates one embodiment of a process for processing deferred transactions after exiting a read-only mode for a portion of the storage system.

FIG. 13 illustrates one embodiment of a process for processing deferred operations related to aborted and committed transactions. Embodiments of the nodes 102 shown in FIG. 1 may be configured to store and/or implement embodiments of the process deferred transactions process 1300. The operations between state 1302 and 1310 are executed for the transactions in the global transaction list. In state 1304, the process deferred transactions process 1300 determines whether the relevant transaction is marked as "commit-deferred" in memory. If the relevant transaction is marked "commit-deferred" in memory, then the process deferred transactions process 1300, in state 1306, marks the relevant transaction as committed in the journal. Then, in state 1308, the process deferred transactions process 1300 communicates to other nodes that the relevant transaction has been committed. Processing deferred commit transactions is also described above with respect to FIG. 6D. In state 1312, the process deferred transactions process 1300 determines whether the DWQ is not empty. If the DWQ is not empty, then the process deferred transactions process 1300, in state 1314, processes the next operation placed in the DWQ. Emptying the DWQ is also described above with reference to FIG. 6D.

IX. Additional Embodiments

While certain embodiments of the invention have been described, these embodiments have been presented by way of example only, and are not intended to limit the scope of the present invention. For example, certain illustrative embodiments of the disclosed systems and methods have been described with reference to a read-only mode for a portion of a clustered storage system. The disclosed systems and methods are not limited by the illustrative examples. For example, in other embodiments, the disclosed systems and methods may implement a read-only mode for a portion of a non-distributed storage system. Many variations are contemplated.

For example, some embodiments may be directed to a distributed block device, which might resemble in functionality, for example, a large hard-disk drive. A distributed block device might be implemented on a cluster of nodes that provide the block-level functionality, for example, of a hard-disk drive. Thus, a distributed block device may be organized at the block level, rather than the file level. A cluster of processing nodes may work together to process read and write requests at specified block offsets, for example. Client processes may deliver read and write requests with an interface for block addresses, rather than filenames. In these embodiments, it may be advantageous to offer a read-only mode for member nodes of a cluster implementing a distributed block device. The embodiments described herein encompass such a distributed system, as well as other possible storage systems.

Embodiments of the disclosed systems and methods may be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, country, and so forth.

What is claimed is:

1. A method of entering a read-only mode for a portion of a storage system, comprising:
    marking as unwritable a transaction journal associated with a portion of a storage system entering a read-only mode;
    backing up the transaction journal without writing to the portion;
    continuing to process, by one or more computer processors, unresolved transactions affecting the portion by marking as commit deferred, without writing to the transaction journal, those transactions for which a commit message is received after entering the read-only mode; and
    processing, by one or more computer processors, those transactions marked commit deferred, after leaving the read-only mode for the portion, by marking each of those transactions as committed in the transaction journal, and sending committed messages to other affected portions of the storage system.

2. The method of claim 1, further comprising continuing to process unresolved transactions affecting the portion by storing in memory, without writing to the transaction journal, a queue of deferred writes to the transaction journal associated with an abort message for an unresolved transaction received after entering the read-only mode for the portion.

3. The method of claim 2, further comprising processing the deferred writes in the queue, after leaving the read-only mode for the portion, by writing the deferred writes in the transaction journal.

4. A non-transitory computer-readable medium having instructions stored thereon, the instructions comprising the method of claim 1.

5. The method of claim 1, further comprising invalidating the backup of the transaction journal after leaving the read-only mode for the portion.

6. The method of claim 1, further comprising deferring one or more writes to at least one transaction journal associated with another portion of the storage system until the portion entering the read-only mode leaves the read-only mode.

7. The method of claim 1, further comprising deferring one or more messages between the portion entering the read-only mode and another portion of the storage system until the portion entering the read-only mode leaves the read-only mode.

8. The method of claim 2, further comprising maintaining states of the unresolved transactions on the memory.

9. The method of claim 8, further comprising maintaining copies of data values associated with the unresolved transactions on the memory.

10. The method of claim 1, wherein continuing to process unresolved transactions affecting the portion comprises:
    maintaining a transaction block for each unresolved transaction, the transaction block stored on a memory and comprising an indication of a state of the corresponding unresolved transaction; and if a commit message is received for a transaction while in the read-only mode for the portion, updating the indication of the state of that transaction in the corresponding transaction block.

11. The method of claim 10, wherein states of the unresolved transactions correspond to states in a commit protocol.

12. The method of claim 10, wherein processing those transactions marked commit deferred, after leaving the read-only mode for the portion, comprises traversing transaction blocks for each unresolved transaction.

13. The method of claim 10, wherein continuing to process unresolved transactions affecting the portion further comprises, if an abort message is received for a transaction while in the read-only mode for the portion, storing a deferred write on the memory, the deferred write comprising an indication that an abort message was received for that transaction.

14. The method of claim 13, further comprising, after leaving the read-only mode for the portion, aborting those transactions for which a deferred write is stored on the memory.

15. The method of claim 1, wherein the transaction journal comprises transaction blocks, each transaction block associated with at least one unresolved transaction and comprising an indication of a state of the associated at least one unresolved transaction.

16. The method of claim 15, further comprising maintaining a queue of deferred writes to the transaction journal.

17. The method of claim 16, wherein one or more of the deferred writes comprises a command to unlink one or more transaction blocks from the transaction journal.

18. The method of claim 1, wherein entering the read-only mode for the portion occurs before the portion has been mounted into the storage system.

19. The method of claim 1, wherein entering the read-only mode for the portion occurs after the portion has been mounted into the storage system.

20. The method of claim 1, wherein the backup of the transaction journal is invalidated after leaving the read-only mode for the portion.

* * * * *